(12) United States Patent
Sunaga et al.

(10) Patent No.: US 8,450,440 B2
(45) Date of Patent: May 28, 2013

(54) METHOD FOR PURIFYING POLYMER AND POLYMER

(75) Inventors: Tadahiro Sunaga, Yamato (JP); Yuichi Okawa, Ichihara (JP); Hiroki Mizutani, Edogawa-ku (JP)

(73) Assignee: Mitsui Chemicals, Inc., Minato-Ku, Tokyo (JP)

( * ) Notice: Subject to any disclaimer, the term of this patent is extended or adjusted under 35 U.S.C. 154(b) by 0 days.

(21) Appl. No.: 13/502,789

(22) PCT Filed: Oct. 15, 2010

(86) PCT No.: PCT/JP2010/006133
§ 371 (c)(1),
(2), (4) Date: Apr. 19, 2012

(87) PCT Pub. No.: WO2011/048784
PCT Pub. Date: Apr. 28, 2011

(65) Prior Publication Data
US 2012/0208976 A1    Aug. 16, 2012

(30) Foreign Application Priority Data

Oct. 21, 2009  (JP) .................................. 2009-242490

(51) Int. Cl.
*C08F 10/00* (2006.01)
*C08G 64/00* (2006.01)

(52) U.S. Cl.
USPC ....................................................... 526/282

(58) Field of Classification Search
USPC ....................................................... 526/282
See application file for complete search history.

(56) References Cited

U.S. PATENT DOCUMENTS

| 5,539,060 | A  | 7/1996  | Tsunogae et al. |
| 6,310,160 | B1 | 10/2001 | Kodemura        |

FOREIGN PATENT DOCUMENTS

| JP | 2-024319    | A  | 1/1990  |
| JP | 4-363312    | A  | 12/1992 |
| JP | 6-240511    | A  | 8/1994  |
| JP | 7-102042    | A  | 4/1995  |
| JP | 7-109310    | A  | 4/1995  |
| JP | 10-324737   | A  | 12/1998 |
| JP | 2001-163958 | A  | 6/2001  |
| JP | 2004-352974 | A  | 12/2004 |
| JP | 2008-101169 | A  | 5/2008  |
| JP | 2008-156569 | A  | 7/2008  |
| JP | 2009-096945 | A  | 5/2009  |
| WO | WO 98/14499 | A1 | 4/1998  |

OTHER PUBLICATIONS

International Search Report (PCT/ISA/210) issued on Dec. 28, 2010, by Japanese Patent Office as the International Searching Authority for International Application No. PCT/JP2010/006133.

*Primary Examiner* — Terressa Boykin
(74) *Attorney, Agent, or Firm* — Buchanan Ingersoll & Rooney PC

(57) ABSTRACT

Disclosed is a method for purifying a polymer in which a solution containing a cyclic olefin polymer having at least a repeating structural unit [A] represented by the general formula (1) and a metal component is brought into contact with an organic compound having a basic functional group and an acidic functional group, and then the resulting solution is brought into contact with a basic adsorbent to remove the metal component contained in the solution.

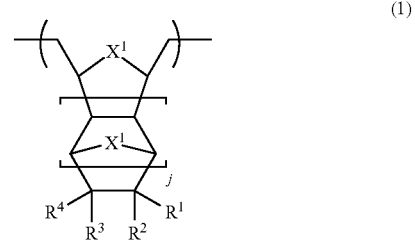

(1)

13 Claims, 3 Drawing Sheets

SYNTHESIS EXAMPLE 1

SYNTHESIS EXAMPLE 2

SYNTHESIS EXAMPLE 3

SYNTHESIS EXAMPLE 4

SYNTHESIS EXAMPLE 5

SYNTHESIS EXAMPLE 6

SYNTHESIS EXAMPLE 7

METHOD FOR PURIFYING POLYMER AND POLYMER

TECHNICAL FIELD

The present invention relates to a method for purifying a polymer and a polymer.

BACKGROUND ART

In late years, in application to optical materials such as mircolenses for digital camera modules, imaging lenses, optical elements (mircolens arrays, optical waveguides, optical switching, Fresnel zone plates, binary optical elements, blazed diffraction optical elements and photonic crystals); application to semiconductor manufacturing process materials such as resist materials for ArF excimer laser exposure or EUV exposure; and application to electronic device materials such as anti-reflection filters, recording media, display materials, organic ELs, liquid crystal plastic materials and the like, there has been increasingly demanded a highly transparent resin material having high purity and there has been reviewed the development of wide application of a cyclic olefin polymer having excellent optical properties in the above fields.

As a method for producing a cyclic olefin polymer, there has been known a method for polymerizing a cyclic olefin monomer using a coordination polymerization catalyst, an addition polymerization catalyst, a living radical polymerization catalyst or a ring-opening metathesis polymerization catalyst and a hydrogenation reaction catalyst (catalyst for use in hydrogen addition (hereinafter referred to as hydrogenation) of double bonds remained after the ring-opening metathesis polymerization).

A metal component contained in the catalyst remains in the cyclic olefin polymer, whereby the metal component causes the change of color in a polymer material and a product, deterioration of optical properties, adverse effect on electrical and electronic properties, contamination of metals in a semiconductor manufacturing process and the like. Thus, an object is to avoid these problems for the development of a cyclic olefin polymer for use in the most advanced technologies.

To solve these problems, there has been proposed a method of removing the residual metal component from the polymer from the past. As a method of removing the residual metal in a cyclic olefin polymer product to be manufactured by the use of a transition metal catalyst, there have been known, for example, a method of bringing a solution of a coordination copolymer of a cyclic olefin monomer and olefin into contact with an aqueous alkali solution or an aqueous acid solution, or a method of bringing a solution of a coordination copolymer of a cyclic olefin monomer and olefin into contact with a filter material such as diatomaceous earth (Patent Document 1), and a method of lowering palladium of 6.0 ppm down to 0.13 ppm relative to the unit mass in the polymer by treating a cyclic olefin polymer obtained by subjecting a cyclic olefin monomer to addition polymerization using a palladium catalyst with an absorbent modified with mercaptopropyltrimethoxysilane on a silica surface (Patent Document 2).

Meanwhile, as a method for purifying a polymer obtained by a ring-opening metathesis polymerization reaction and a hydrogenation reaction, there has been known a method for obtaining a hydrogenated thermoplastic norbornene polymer having the content of metals such as titanium derived from a polymerization catalyst of equal to or less than 1 ppm by treating a polymer solution containing a polymerization catalyst residue with a hydrogenation catalyst-supported adsorbent (Patent Document 3).

Patent Document 4 discloses the following method.

A hydrogenated ring-opening metathesis polymer solution is obtained by subjecting a cyclic olefin monomer containing ester to ring-opening metathesis polymerization using a tungsten catalyst, and then carrying out a hydrogenation reaction using a ruthenium complex catalyst. Thereafter, an oxidant or a basic compound is added to the hydrogenated ring-opening metathesis polymer solution, and an operation to extract the residual metal component is repeatedly carried out to remove the metal component in a poor solvent phase. Then, tungsten in the polymer is reduced to less than 3 ppm and ruthenium is reduced to less than 0.1 ppm.

Furthermore, Patent Document 5 discloses the following method.

A cyclic olefin monomer having a cyano group is subjected to ring-opening metathesis polymerization using a molybdenum catalyst. Thereafter, trimethylenediamine is added thereto, and a polymer solution is added to methanol with stirring to precipitate a ring-opening metathesis polymer. Furthermore, the ring-opening metathesis polymer is brought into contact with an acidic compound and then the metal component is reduced to 30 ppm from 430 ppm by being discharging into methanol.

Patent Document 6 discloses the following method.

3,6-epoxy-1,2,3,6-tetrahydrophthalic anhydride is subjected to ring-opening metathesis polymerization with bis (tricyclohexylphosphine)benzylideneruthenium chloride, that is, a ring-opening metathesis catalyst, and inactivated with vinyl acetate after completion of polymerization. Therefore, a cyclic olefin polymer containing an oxygen atom in the main chain of the polymer is obtained. A solution containing the polymer is adsorbed by passing through activated alumina three times, whereby the polymer is purified by removing the transition metal derived from the polymerization catalyst.

RELATED DOCUMENT

Patent Document

Patent Document 1: Japanese Laid-open Patent Publication No. H06-240511
Patent Document 2: Japanese Laid-open Patent Publication No. 2008-101169
Patent Document 3: Japanese Laid-open Patent Publication No. H04-363312
Patent Document 4: Japanese Laid-open Patent Publication No. H07-109310
Patent Document 5: Japanese Laid-open Patent Publication No. H10-324737
Patent Document 6: Japanese Laid-open Patent Publication No. 2001-163958

DISCLOSURE OF THE INVENTION

The target of the methods disclosed in Patent Documents 1 to 3 is a polymer without having a hetero atom capable of easily forming a coordinate bond with a catalyst metal in a skeleton of the cyclic olefin polymer. In the methods disclosed in Patent Documents 1 to 3, when the polymer has a skeleton containing a hetero atom capable of easily forming a coordinate bond with a catalyst metal, it is difficult to remove the metal component.

In the method disclosed in Patent Document 4, there is a need to repeatedly carry out complicated extraction and separation of a poor solvent phase and a good solvent phase, so that there are rooms for improving the removal efficiency of the residual metal component.

Also, in the method disclosed in Patent Document 5, operations such as recovery of the precipitated cyclic olefin polymer and re-dissolving of the polymer in a solvent are complicated, so that there are rooms for improving the removal efficiency of the residual metal component.

In addition thereto, the level of removal of the metal has not been necessarily satisfied in the methods disclosed in Patent Documents 4 and 5.

Also, the method disclosed in Patent Document 6 has not been fully satisfied as a purification method with the metal derived from the polymerization catalyst reduced only to 200 ppm.

The present invention has been accomplished in order to solve the above problems. An object is to provide a purification method in which the residual metal component can be removed with good efficiency and the residual metal component can surely be reduced.

The present invention is specified by matters described in below:

[1] A method for purifying a polymer in which a solution containing a cyclic olefin polymer having at least a repeating structural unit [A] represented by the general formula (1) and a metal component is brought into contact with an organic compound containing a basic functional group and an acidic functional group, and then the solution is brought into contact with a basic adsorbent to remove the metal component contained in said solution,

[Chemical Formula 1]

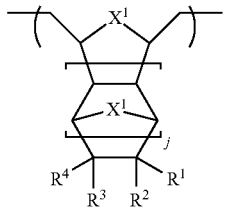

(1)

wherein, in the formula, at least one of $R^1$ to $R^4$ is selected from alkoxycarbonyl having 2 to 20 carbon atoms, alkoxyalkyloxycarbonyl having 3 to 20 carbon atoms, alkoxycarbonylalkyloxycarbonyl having 4 to 20 carbon atoms and cyano having 1 to 20 carbon atoms, the others are selected from hydrogen, alkyl having 1 to 20 carbon atoms, halogen, alkyl halide having 1 to 20 carbon atoms, alkoxy having 1 to 20 carbon atoms, alkoxyalkyl having 2 to 20 carbon atoms and aryloxycarbonyl having 6 to 20 carbon atoms, and $R^1$ to $R^4$ may be bonded to each other to form a cyclic structure; $X^1$ is selected from —O—, —S—, —NR$^5$—, —PR$^5$— and —CR$^5$R$^6$— (R$^5$ and R$^6$ each independently represent hydrogen or alkyl having 1 to 20 carbon atoms) and may be the same or different from each other; and j represents 0 or 1.

[2] The method for purifying a polymer according to [1], in which the metal component is any of molybdenum, ruthenium, tungsten, palladium and rhodium.

[3] The method for purifying a polymer according to [1] or [2], in which the basic functional group of the organic compound is an electron-pair donor and the acidic functional group is a proton donor.

[4] The method for purifying a polymer according to any one of [1] to [3], in which the organic compound containing a basic functional group and an acidic functional group is any of nicotinic acid, isonicotinic acid, picolinic acid, 2,2'-bipyridine-4,4'-dicarboxylic acid and 3-pyridinesulfonic acid.

[5] The method for purifying a polymer according to any one of [1] to [4], in which the basic functional group contained in the basic adsorbent is an amino group.

[6] The method for purifying a polymer according to any one of [1] to [5], in which the solution containing the cyclic olefin polymer is brought into contact with the organic compound containing a basic functional group and an acidic functional group to form an aggregate consisting of the metal component contained in the solution and the organic compound, and the solution forming the aggregate is brought into contact with a basic adsorbent and the aggregate contained in the solution is adsorbed onto the basic adsorbent to remove the metal component contained in the solution.

[7] The method for purifying a polymer according to any one of [1] to [6], in which the solution containing the cyclic olefin polymer is brought into contact with the organic compound containing a basic functional group and an acidic functional group, and then the solution containing the cyclic olefin polymer is allowed to pass through a basic adsorbent-packed tower to remove the metal component.

[8] The method for purifying a polymer according to any one of [1] to [6], in which the solution containing the cyclic olefin polymer is mixed with the organic compound containing a basic functional group and an acidic functional group, and then the basic adsorbent is added to this mixture, to remove the metal component by separating the basic adsorbent.

[9] The method for purifying a polymer according to any one of [1] to [8], in which the cyclic olefin polymer has a repeating structural unit [B] represented by the general formula (2), and the molar ratio [A]/[B] of the repeating structural unit [A] to the repeating structural unit [B] is from 25/75 to 90/10,

[Chemical Formula 2]

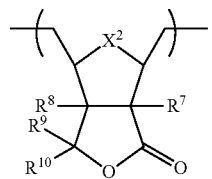

(2)

wherein, in the formula, $R^7$ to $R^{10}$ are each independently hydrogen or alkyl having 1 to 10 carbon atoms; and $X^2$ is selected from —O—, —S—, —NR$^{11}$—, —PR$^{11}$— and —CR$^{11}$R$^{12}$— ($R^{11}$ and $R^{12}$ each independently represent hydrogen or alkyl having 1 to 20 carbon atoms).

[10] The method for purifying a polymer according to [9], in which one of $X^1$ of the repeating structural unit [A] and $X^2$ of the repeating structural unit [B] is —O—, and the other is —CH$_2$—.

[11] The method for purifying a polymer according to [9], in which the cyclic olefin polymer has the repeating structural unit [B] and a repeating structural unit [C] represented by the general formula (3), and the molar ratio ([A]+[B])/[C] of the repeating structural units [A] and [B] to the repeating structural unit [C] is from 95/5 to 5/95,

[Chemical Formula 3]

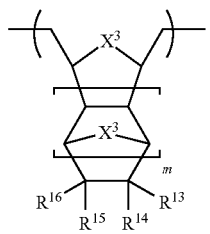

(3)

wherein, in the formula, at least one of $R^{13}$ to $R^{16}$ is selected from carboxylic acid and hydroxycarbonylalkyl having 2 to 20 carbon atoms, the others are selected from hydrogen, alkyl having 1 to 20 carbon atoms, halogen, alkyl halide having 1 to 20 carbon atoms, alkoxy having 1 to 20 carbon atoms, alkoxyalkyl having 2 to 20 carbon atoms, alkoxycarbonyl having 2 to 20 carbon atoms and aryloxycarbonyl having 6 to 20 carbon atoms, and $R^{13}$ to $R^{16}$ may be bonded to each other to form a cyclic structure; $X^3$ is selected from —O—, —S—, —$NR^{17}$—, —$PR^{17}$— and —$CR^{17}R^{18}$— ($R^{17}$ and $R^{18}$ each independently represent hydrogen or alkyl having 1 to 20 carbon atoms) and may be the same or different from each other; and m represents 0 or 1.

[12] The method for purifying a polymer according to [11], in which at least one of $X^1$ of the repeating structural unit [A], $X^2$ of the repeating structural unit [B] and $X^3$ of the repeating structural unit [C] is —O—, and the other are —$CH_2$—.

[13] A cyclic olefin polymer, wherein the content of all residual metal components obtained by the purification method according to any one of [1] to [12] is equal to or less than 1,000 ppb.

According to the present invention, there are provided a purification method in which the metal component can be removed with good efficiency and the metal component can surely be reduced, and a polymer purified according to the purification method.

DESCRIPTION OF EMBODIMENTS

Figure 1:
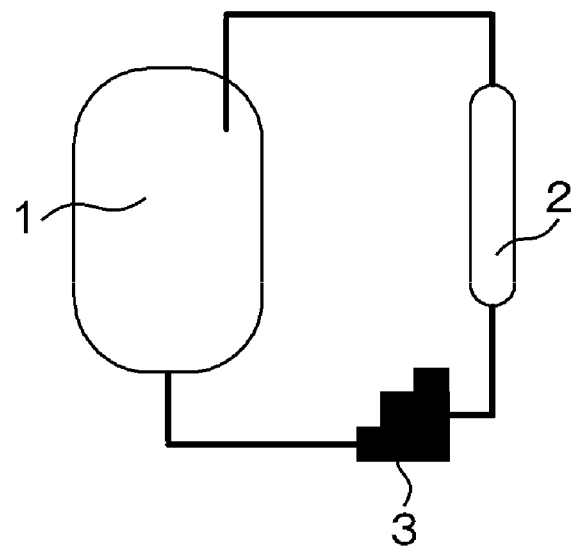
FIG. 1 is a schematic view illustrating a purifier.

Hereinafter, embodiments of the present invention will be illustrated with reference to the drawings.

Firstly, a summary of the present invention will be described.

The method for purifying a polymer of the present invention is a method for purifying a polymer in which a solution containing a cyclic olefin polymer having at least a repeating structural unit [A] represented by the general formula (1) and a metal component is brought into contact with an organic compound containing a basic functional group and an acidic functional group, and then the solution is brought into contact with a basic adsorbent to remove the metal component contained in the solution,

[Chemical Formula 4]

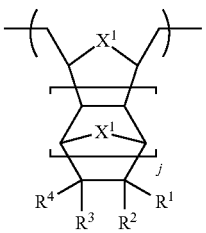

(1)

wherein, in the formula, at least one of $R^1$ to $R^4$ is selected from alkoxycarbonyl having 2 to 20 carbon atoms, alkoxyalkyloxycarbonyl having 3 to 20 carbon atoms, alkoxycarbonylalkyloxycarbonyl having 4 to 20 carbon atoms and cyano having 1 to 20 carbon atoms, the others are selected from hydrogen, alkyl having 1 to 20 carbon atoms, halogen, alkyl halide having 1 to 20 carbon atoms, alkoxy having 1 to 20 carbon atoms, alkoxyalkyl having 2 to 20 carbon atoms and aryloxycarbonyl having 6 to 20 carbon atoms, and $R^1$ to $R^4$ may be bonded to each other to form a cyclic structure; X' is selected from —O—, —S—, —$NR^5$—, —$PR^5$— and —$CR^5R^6$— ($R^5$ and $R^6$ each independently represent hydrogen or alkyl having 1 to 20 carbon atoms) and may be the same or different from each other; and j represents 0 or 1.

Incidentally, some of $R^1$ to $R^4$ are selected from alkoxycarbonyl having 2 to 20 carbon atoms, alkoxyalkyloxycarbonyl having 3 to 20 carbon atoms, alkoxycarbonylalkyloxycarbonyl having 4 to 20 carbon atoms and cyano having 1 to 20 carbon atoms, and the others are selected from hydrogen, alkyl having 1 to 20 carbon atoms, halogen, alkyl halide having 1 to 20 carbon atoms, alkoxy having 1 to 20 carbon atoms, alkoxyalkyl having 2 to 20 carbon atoms, aryloxycarbonyl having 6 to 20 carbon atoms. However, $R^1$ to $R^4$ may be the same.

Herein, the metal component contained in the aforementioned cyclic olefin polymer is mainly a residual metal component derived from a ring-opening metathesis polymerization catalyst used for ring-opening metathesis polymerization at the time of producing the aforementioned cyclic olefin polymer, and a residual metal component derived from a hydrogenation catalyst by hydrogenating the double bonds in the main chain of the polymer obtained by ring-opening metathesis polymerization to give saturated bonds.

In the present invention, it is possible to carry out purification of a polymer in the solution state to remove the residual metal component effectively and efficiently without conducting an operation for precipitating a polymer solution containing a metal component (metal component of production catalyst) such as molybdenum, palladium, rhodium, ruthenium, tungsten contained in the cyclic olefin polymer containing a hetero atom and having high polarity with a poor solvent, or an operation such as cleaning and separating of the polymer solution.

Cyclic Olefin Polymer and Polymerization of Cyclic Olefin Polymer

The cyclic olefin polymer targeted to be purified is a cyclic olefin polymer containing at least the repeating structural unit [A] represented by the aforementioned general formula (1). At least one of $R^1$ to $R^4$ is selected from alkoxycarbonyl having 2 to 20 carbon atoms, alkoxyalkyloxycarbonyl having 3 to 20 carbon atoms, alkoxycarbonylalkyloxycarbonyl having 4 to 20 carbon atoms and cyano having 1 to 20 carbon atoms.

Herein, examples of the alkoxycarbonyl having 2 to 20 carbon atoms include methoxycarbonyl, ethoxycarbonyl, n-propoxycarbonyl, isopropoxycarbonyl, n-butoxycarbonyl, isobutoxycarbonyl, tert-butoxycarbonyl, cyclopentyloxycarbonyl, cyclohexyloxycarbonyl, cyclooctyloxycarbonyl, norbornyloxycarbonyl, 1-methylcyclopentyloxycarbonyl, 1-ethylcyclopentyloxycarbonyl, 1-methylnorbornyloxycarbonyl, 1-ethylnorbornyloxycarbonyl, 1-ethoxypropyloxycarbonyl, 1-ethoxy-1-methylethyloxycarbonyl, tetrahydrofuran-2-yloxycarbonyl, tetrahydropyran-2-yloxycarbonyl, 1-adamantyloxycarbonyl, 2-adamantyloxycarbonyl and the like. Among these, preferably used are tert-butoxycarbonyl, 1-methylcyclopentyloxycarbonyl, 1-ethylcyclopentyloxycarbonyl, 1-methylnorbornyloxycarbonyl, 1-ethylnorbornyloxycarbonyl, 1-ethoxypropyloxycarbonyl, 1-ethoxy-1-methylethyloxycarbonyl, tetrahydrofuran-2-yloxycarbonyl, tetrahydropyran-2-yloxycarbonyl, 1-adamantyloxycarbonyl and 2-adamantyloxycarbonyl.

Examples of the alkoxyalkyloxycarbonyl having 3 to 20 carbon atoms include methoxymethyloxycarbonyl, ethoxymethyloxycarbonyl, n-propoxymethyloxycarbonyl, isopropoxymethyloxycarbonyl, n-butoxymethyloxycarbonyl, isobutoxymethyloxycarbonyl, tert-butoxymethyloxycarbonyl, cyclopentyloxymethyloxycarbonyl, cyclohexyloxymethyloxycarbonyl, cyclooctyloxymethyloxycarbonyl, norbornyloxymethyloxycarbonyl, 1-methylcyclopentyloxymethyloxycarbonyl, 1-ethylcyclopentyloxymethyloxycarbonyl, 1-methylnorbornyloxymethyloxycarbonyl, 1-ethylnorbornyloxymethyloxycarbonyl, 1-ethoxypropyloxymethyloxycarbonyl, 1-ethoxy-1-methylethyloxymethyloxycarbonyl, tetrahydrofuran-2-yloxymethyloxycarbonyl, tetrahydropyran-2-yloxymethyloxycarbonyl, 1-adamantyloxymethyloxycarbonyl, 2-adamantyloxymethyloxycarbonyl and the like. Among these, preferably used are methoxymethyloxycarbonyl, ethoxymethyloxycarbonyl, n-propoxymethyloxycarbonyl, isopropoxymethyloxycarbonyl, n-butoxymethyloxycarbonyl, isobutoxymethyloxycarbonyl, tert-butoxymethyloxycarbonyl, cyclopentyloxymethyloxycarbonyl, cyclohexyloxymethyloxycarbonyl, cyclooctyloxymethyloxycarbonyl and norbornyloxymethyloxycarbonyl.

Examples of the alkoxycarbonylalkyloxycarbonyl having 4 to 20 carbon atoms include methoxycarbonylmethyloxycarbonyl, ethoxycarbonylmethyloxycarbonyl, n-propoxycarbonylmethyloxycarbonyl, isopropoxycarbonylmethyloxycarbonyl, n-butoxycarbonylmethyloxycarbonyl, isobutoxycarbonylmethyloxycarbonyl, tert-butoxycarbonylmethyloxycarbonyl, cyclopentyloxycarbonylmethyloxycarbonyl, cyclohexyloxycarbonylmethyloxycarbonyl, cyclooctyloxycarbonylmethyloxycarbonyl, norbornyloxycarbonylmethyloxycarbonyl, 1-methylcyclopentyloxycarbonylmethyloxycarbonyl, 1-ethylcyclopentyloxycarbonylmethyloxycarbonyl, 1-methylnorbornyloxycarbonylmethyloxycarbonyl, 1-ethylnorbornyloxycarbonylmethyloxycarbonyl, 1-ethoxypropyloxycarbonylmethyloxycarbonyl, 1-ethoxy-1-methylethyloxycarbonylmethyloxycarbonyl, tetrahydrofuran-2-yloxycarbonylmethyloxycarbonyl, tetrahydropyran-2-yloxycarbonylmethyloxycarbonyl, 1-adamantyloxycarbonylmethyloxycarbonyl, 2-adamantyloxycarbonylmethyloxycarbonyl and the like. Among these, preferably used are tert-butoxycarbonylmethyloxycarbonyl, 1-methylcyclopentyloxycarbonylmethyloxycarbonyl, 1-ethylcyclopentyloxycarbonylmethyloxycarbonyl, 1-methylnorbornyloxycarbonylmethyloxycarbonyl, 1-ethylnorbornyloxycarbonylmethyloxycarbonyl, 1-ethoxypropyloxycarbonylmethyloxycarbonyl, 1-ethoxy-1-methylethyloxycarbonylmethyloxycarbonyl, tetrahydrofuran-2-yloxycarbonylmethyloxycarbonyl, tetrahydropyran-2-yloxycarbonylmethyloxycarbonyl, 1-adamantyloxycarbonylmethyloxycarbonyl and 2-adamantyloxycarbonylmethyloxycarbonyl.

Examples of the cyano having 1 to 20 carbon atoms include a cyano group, and a cyanoalkyl group having 2 to 20 carbon atoms such as cyanomethyl, cyanoethyl, 1-cyanopropyl, 1-cyanobutyl, 1-cyanohexyl. Among these, preferably used are cyano, cyanomethyl and cyanoethyl.

Other $R^1$ to $R^4$ are selected from hydrogen, alkyl having 1 to 20 carbon atoms, halogen, alkyl halide having 1 to 20 carbon atoms, alkoxy having 1 to 20 carbon atoms, alkoxyalkyl having 2 to 20 carbon atoms and aryloxycarbonyl having 6 to 20 carbon atoms.

Examples of the alkyl having 1 to 20 carbon atoms include methyl, ethyl, propyl, isopropyl, n-butyl, isobutyl, tert-butyl, cyclopentyl, cyclohexyl and the like.

Furthermore, examples of halogen include fluorine, chlorine, bromine and iodine.

Examples of the alkyl halide having 1 to 20 carbon atoms include fluoromethyl, chloromethyl, bromomethyl, difluoromethyl, dichloromethyl, dibromomethyl, trifluoromethyl, trichloromethyl, tribromomethyl and the like.

Examples of the alkoxy having 1 to 20 carbon atoms include methoxy, ethoxy, n-propoxy, isopropoxy, n-butoxy, tert-butoxy, menthoxy and the like. Examples of the alkoxyalkyl having 2 to 20 carbon atoms include methoxymethyl, methoxyethyl, ethoxymethyl, tert-butoxymethyl, tert-butoxyethyl, methoxymethyl and the like. Examples of the aryloxycarbonyl having 6 to 20 carbon atoms include phenoxycarbonyl, naphthoxycarbonyl and the like.

$R^1$ to $R^4$ may be bonded to each other to form a cyclic structure. $X^1$ is selected from —O—, —S—, —$NR^5$—, —$PR^5$— and —$CR^5R^6$— ($R^5$ and $R^6$ each independently represent hydrogen or alkyl having 1 to 20 carbon atoms), and may be the same or different from each other. j represents 0 or 1.

As the alkyl having 1 to 20 carbon atoms, preferably used are methyl and ethyl.

The cyclic olefin polymer may be obtained by polymerization of a cyclic olefin monomer corresponding to the repeating structural unit [A] represented by the general formula (1) and a cyclic olefin monomer corresponding to the repeating structural unit [B] represented by the general formula (2) in the presence of a ring-opening metathesis catalyst, and subjecting it to hydrogenation in the presence of a hydrogenation catalyst,

[Chemical Formula 5]

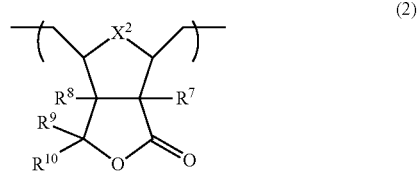

(2)

wherein, in the formula, $R^7$ to $R^{10}$ are each independently hydrogen or alkyl having 1 to 10 carbon atoms; and $X^2$ is selected from —O—, —S—, —$NR^{11}$— and —$CR^{11}R^{12}$— ($R^{11}$ and $R^{12}$ each independently represent hydrogen or alkyl having 1 to 20 carbon atoms), and may be the same or different from each other.

In the general formula (2), $R^7$ to $R^{10}$ are each independently hydrogen, alkyl having 1 to 10 carbon atoms such as methyl, ethyl, propyl, isopropyl, n-butyl, isobutyl, tert-butyl, cyclopentyl, cyclohexyl, 1-ethylcyclopentyl, 1-ethylcyclohexyl; $X^2$ is selected from —O—, —S—, and —$CR^{11}R^{12}$— ($R^{11}$ and $R^{12}$ represent hydrogen or alkyl having 1 to 20 carbon atoms); and examples of $R^{11}$ and $R^{12}$ include alkyl having 1 to 20 carbon atoms such as methyl, ethyl, isopropyl, tert-butyl, cyclohexyl and the like.

In the preferred embodiments of the present invention, the constitutional molar ratio [A]/[B] of the structural unit [A] represented by the general formula (1) to the structural unit [B] represented by the general formula (2) is from 25/75 to 90/10, preferably from 30/70 to 80/20 and further preferably from 35/65 to 70/30.

Herein, from the viewpoints of higher polarity, suppression of water repellency and design of the water contact angle as a polymer material at a smaller angle, it is preferable that one of $X^1$ of the structural unit [A] and $X^2$ of the structural unit [B] is —O—, and the other is —$CH_2$—.

Furthermore, the cyclic olefin polymer according to the present invention may be obtained by polymerization of a cyclic olefin monomer corresponding to the repeating structural unit [A] represented by the general formula (1), a cyclic olefin monomer corresponding to the repeating structural unit [B] represented by the general formula (2) and a cyclic olefin monomer corresponding to the repeating structural unit [C] represented by the general formula (3) in the presence of a ring-opening metathesis catalyst, and subjecting it to hydrogenation in the presence of a hydrogenation catalyst.

It may be obtained by polymerization of a cyclic olefin monomer corresponding to the repeating structural unit [A] represented by the general formula (1) and a cyclic olefin monomer corresponding to the repeating structural unit [B] represented by the general formula (2) in the presence of a ring-opening metathesis catalyst, and subjecting it to hydrogenation in the presence of a hydrogenation catalyst, and then subjecting esters of some of $R^1$ to $R^4$ in the structural unit [A] among the structural units [A] represented by the general formula (1) to hydrolysis with an acid or an alkali, acid decomposition or pyrolysis, to give a cyclic olefin polymer containing the structural unit [C] represented by the general formula (3),

[Chemical Formula 6]

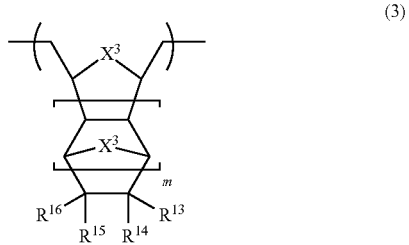

(3)

wherein, in the formula, at least one of $R^{13}$ to $R^{16}$ is selected from carboxylic acid and hydroxycarbonylalkyl having 2 to 20 carbon atoms, the others are selected from hydrogen, alkyl having 1 to 20 carbon atoms, halogen, alkyl halide having 1 to 20 carbon atoms, alkoxy having 1 to 20 carbon atoms, alkoxyalkyl having 2 to 20 carbon atoms, alkoxycarbonyl having 2 to 20 carbon atoms and aryloxycarbonyl having 6 to 20 carbon atoms, and $R^{13}$ to $R^{16}$ may be bonded to each other to form a cyclic structure; $X^3$ is selected from —O—, —S—, —$NR^{17}$—, —$PR^{17}$— and —$CR^{17}R^{18}$— ($R^{17}$ and $R^{18}$ each independently represent hydrogen or alkyl having 1 to 20 carbon atoms), and may be the same or different from each other; and m represents 0 or 1.

Some of $R^{13}$ to $R^{16}$ are selected from carboxylic acid and hydroxycarbonylalkyl having 2 to 20 carbon atoms, and the others are selected from hydrogen, alkyl having 1 to 20 carbon atoms, halogen, alkyl halide having 1 to 20 carbon atoms, alkoxy having 1 to 20 carbon atoms, alkoxyalkyl having 2 to 20 carbon atoms, alkoxycarbonyl having 2 to 20 carbon atoms and aryloxycarbonyl having 6 to 20 carbon atoms. Or, $R^{13}$ to $R^{16}$ may be the same.

The carboxylic acid is a group having a carboxyl group (carboxylic acid group) and is, for example, —COOH.

Examples of the hydroxycarbonylalkyl having 2 to 20 carbon atoms include hydroxycarbonylmethyl, hydroxycarbonylethyl, hydroxycarbonylpropyl, hydroxycarbonylbutyl and the like.

Examples of the alkyl having 1 to 20 carbon atoms include methyl, ethyl, propyl, isopropyl, n-butyl, isobutyl, tert-butyl, cyclopentyl, cyclohexyl and the like.

Examples of the alkyl halide having 1 to 20 carbon atoms include fluoromethyl, chloromethyl, bromomethyl, difluoromethyl, dichloromethyl, dibromomethyl, trifluoromethyl, trichloromethyl, tribromomethyl and the like.

Examples of the alkoxy having 1 to 20 carbon atoms include methoxy, ethoxy, n-propoxy, isopropoxy, n-butoxy, tert-butoxy, menthoxy and the like.

Examples of the alkoxyalkyl having 2 to 20 carbon atoms include methoxymethyl, methoxyethyl, ethoxymethyl, tert-butoxymethyl, tert-butoxyethyl, methoxymethyl and the like.

Examples of the alkoxycarbonyl having 2 to 20 carbon atoms include methoxycarbonyl, ethoxycarbonyl, n-propoxycarbonyl, isopropoxycarbonyl, n-butoxycarbonyl, isobutoxycarbonyl, tert-butoxycarbonyl and the like.

Examples of the aryloxycarbonyl having 6 to 20 carbon atoms include phenoxycarbonyl, naphthoxycarbonyl and the like.

Examples of the alkyl group of $R^{17}$ and $R^{18}$ include methyl, ethyl, propyl and the like.

In the preferred embodiments of the present invention, the constitutional molar ratio ([A]+[B])/[C] of the structural unit [A] represented by the general formula (1) and the structural unit [B] represented by the general formula (2) to the structural unit [C] represented by the general formula (3) is from 95/5 to 5/95, preferably from 90/10 to 10/90 and further preferably from 80/20 to 20/80.

Herein, from the viewpoints of higher polarity, suppression of water repellency and design of the water contact angle as a polymer material at a smaller angle, it is preferable that at least one of $X^1$ of the structural unit [A], $X^2$ of the structural unit [B] and $X^3$ of the structural unit [C] is —O—, and the others are —$CH_2$—.

Specific examples of the cyclic olefin monomer of the cyclic olefin polymer obtained by polymerization and hydrogenation in which j=0 and $X^1$ is —$CH_2$— in the repeating structural unit [A] represented by the general formula (1) include
5-methoxycarbonyl-bicyclo[2.2.1]hept-2-ene,
5-ethoxycarbonyl-bicyclo[2.2.1]hept-2-ene,
5-(n-propoxycarbonyl)-bicyclo[2.2.1]hept-2-ene,
5-isopropoxycarbonyl-bicyclo[2.2.1]hept-2-ene,
5-(n-butoxycarbonyl)-bicyclo[2.2.1]hept-2-ene,
5-isobutoxycarbonyl-bicyclo[2.2.1]hept-2-ene,
5-(tert-butoxycarbonyl)-bicyclo[2.2.1]hept-2-ene,
5-cyclopentyloxycarbonyl-bicyclo[2.2.1]hept-2-ene,
5-cyclohexyloxycarbonyl-bicyclo[2.2.1]hept-2-ene, 5-cyclooctyloxycarbonyl-bicyclo[2.2.1]hept-2-ene,
5-norbonyloxycarbonyl-bicyclo[2.2.1]hept-2-ene,
5-(1-methylcyclopentyloxycarbonyl)-bicyclo[2.2.1]hept-2-ene,
5-(1-ethylcyclopentyloxycarbonyl)-bicyclo[2.2.1]hept-2-ene,
5-(1-methylnorbonyloxycarbonyl)-bicyclo[2.2.1]hept-2-ene,
5-(1-ethylnorbonyloxycarbonyl)-bicyclo[2.2.1]hept-2-ene,
5-(1-ethoxypropyloxyoxycarbonyl)-bicyclo[2.2.1]hept-2-ene,
5-(1-ethoxy-1-methylethyloxycarbonyl)-bicyclo[2.2.1]hept-2-ene,
5-(tetrahydrofuran-2-yloxycarbonyl)-bicyclo[2.2.1]hept-2-ene,
5-(tetrahydropyran-2-yloxycarbonyl)-bicyclo[2.2.1]hept-2-ene,
5-(1-adamantyloxycarbonyl)-bicyclo[2.2.1]hept-2-ene,
5-(2-adamantyloxycarbonyl)-bicyclo[2.2.1]hept-2-ene,
5-methoxymethyloxycarbonyl-bicyclo[2.2.1]hept-2-ene,
5-ethoxymethyloxycarbonyl-bicyclo[2.2.1]hept-2-ene,
5-(n-propoxymethyloxycarbonyl)-bicyclo[2.2.1]hept-2-ene,
5-isopropoxymethyloxycarbonyl-bicyclo[2.2.1]hept-2-ene,
5-(n-butoxymethyloxycarbonyl)-bicyclo[2.2.1]hept-2-ene,
5-(2-methyl-propoxymethyloxycarbonyl)-bicyclo[2.2.1]hept-2-ene,
5-(tert-butoxymethyloxycarbonyl)-bicyclo[2.2.1]hept-2-ene,
5-cyclopentyloxymethyloxycarbonyl-bicyclo[2.2.1]hept-2-ene,
5-cyclohexyloxymethyloxycarbonyl-bicyclo[2.2.1]hept-2-ene,
5-cyclooctyloxymethyloxycarbonyl-bicyclo[2.2.1]hept-2-ene,
5-norbonyloxymethyloxycarbonyl-bicyclo[2.2.1]hept-2-ene,
5-(1-methylcyclopentyloxymethyloxycarbonyl)-bicyclo[2.2.1]hept-2-ene,
5-(1-ethylcyclopentyloxymethyloxycarbonyl)-bicyclo[2.2.1]hept-2-ene,
5-(1-methylnorbonyloxymethyloxycarbonyl)-bicyclo[2.2.1]hept-2-ene,
5-(1-ethylnorbonyloxymethyloxycarbonyl)-bicyclo[2.2.1]hept-2-ene,
5-(1-ethoxypropyloxymethyloxycarbonyl)-bicyclo[2.2.1]hept-2-ene,
5-(1-ethoxy-1-methylethyloxymethyloxycarbonyl)-bicyclo[2.2.1]hept-2-ene,
5-(tetrahydrofuran-2-yloxymethyloxycarbonyl)-bicyclo[2.2.1]hept-2-ene,
5-(tetrahydropyran-2-yloxymethyloxycarbonyl)-bicyclo[2.2.1]hept-2-ene,
5-(1-adamantyloxymethyloxycarbonyl)-bicyclo[2.2.1]hept-2-ene,
5-(2-adamantyloxymethyloxycarbonyl)-bicyclo[2.2.1]hept-2-ene,
5-methoxycarbonylmethyloxycarbonyl-bicyclo[2.2.1]hept-2-ene,
5-ethoxycarbonylmethyloxycarbonyl-bicyclo[2.2.1]hept-2-ene,
5-(n-propoxycarbonylmethyloxycarbonyl)-bicyclo[2.2.1]hept-2-ene,
5-isopropoxycarbonylmethyloxycarbonyl-bicyclo[2.2.1]hept-2-ene,
5-(n-butoxycarbonylmethyloxycarbonyl)-bicyclo[2.2.1]hept-2-ene,
5-isobutoxycarbonylmethyloxycarbonyl-bicyclo[2.2.1]hept-2-ene,
5-(tert-butoxycarbonylmethyloxycarbonyl)-bicyclo[2.2.1]hept-2-ene,
5-cyclopentyloxycarbonylmethyloxycarbonyl-bicyclo[2.2.1]hept-2-ene,
5-cyclohexyloxycarbonylmethyloxycarbonyl-bicyclo[2.2.1]hept-2-ene,
5-cyclooctyloxycarbonylmethyloxycarbonyl-bicyclo[2.2.1]hept-2-ene,
5-norbornyloxycarbonylmethyloxycarbonyl-bicyclo[2.2.1]hept-2-ene,
5-(1-methylcyclopentyloxycarbonylmethyloxycarbonyl)-bicyclo[2.2.1]hept-2-ene,
5-(1-ethylcyclopentyloxycarbonylmethyloxycarbonyl)-bicyclo[2.2.1]hept-2-ene,
5-(1-methylnorbonyloxycarbonylmethyloxycarbonyl)-bicyclo[2.2.1]hept-2-ene,
5-(1-ethylnorbonyloxycarbonylmethyloxycarbonyl)-bicyclo[2.2.1]hept-2-ene,
5-(1-ethoxypropyloxycarbonylmethyloxycarbonyl)-bicyclo[2.2.1]hept-2-ene,
5-(1-ethoxy-1-methylethyloxycarbonylmethyloxycarbonyl)-bicyclo[2.2.1]hept-2-ene,
5-(tetrahydrofuran-2-yloxycarbonylmethyloxycarbonyl)-bicyclo[2.2.1]hept-2-ene,
5-(tetrahydropyran-2-yloxycarbonylmethyloxycarbonyl)-bicyclo[2.2.1]hept-2-ene,
5-(1-adamantyloxycarbonylmethyloxycarbonyl)-bicyclo[2.2.1]hept-2-ene,
5-(2-adamantyloxycarbonylmethyloxycarbonyl)-bicyclo[2.2.1]hept-2-ene, 5-cyano-bicyclo[2.2.1]hept-2-ene,
5-cyanomethyl-bicyclo[2.2.1]hept-2-ene,
5-cyanoethyl-bicyclo[2.2.1]hept-2-ene,
5-cyanopropyl-bicyclo[2.2.1]hept-2-ene and the like.

Furthermore, specific examples of the cyclic olefin monomer of the cyclic olefin polymer obtained in the same manner as above in which j=0 and $X^1$ is —O— in the repeating structural unit [A] represented by the general formula (1) include 5-methoxycarbonyl-7-oxabicyclo[2.2.1]hept-2-ene,
5-ethoxycarbonyl-7-oxabicyclo[2.2.1]hept-2-ene,
5-(n-propoxycarbonyl)-7-oxabicyclo[2.2.1]hept-2-ene,
5-isopropoxycarbonyl-7-oxabicyclo[2.2.1]hept-2-ene,
5-(n-butoxycarbonyl)-7-oxabicyclo[2.2.1]hept-2-ene,
5-isobutoxycarbonyl-7-oxabicyclo[2.2.1]hept-2-ene,
5-(tert-butoxycarbonyl)-7-oxabicyclo[2.2.1]hept-2-ene,
5-cyclopentyloxycarbonyl-7-oxabicyclo[2.2.1]hept-2-ene,
5-cyclohexyloxycarbonyl-7-oxabicyclo[2.2.1]hept-2-ene,
5-cyclooctyloxycarbonyl-7-oxabicyclo[2.2.1]hept-2-ene,
5-norbonyloxycarbonyl-7-oxabicyclo[2.2.1]hept-2-ene,
5-(1-methylcyclopentyloxycarbonyl)-7-oxabicyclo[2.2.1]hept-2-ene,
5-(1-ethylcyclopentyloxycarbonyl)-7-oxabicyclo[2.2.1]hept-2-ene,
5-(1-methylnorbonyloxycarbonyl)-7-oxabicyclo[2.2.1]hept-2-ene,
5-(1-ethylnorbonyloxycarbonyl)-7-oxabicyclo[2.2.1]hept-2-ene,
5-(1-ethoxypropyloxyoxycarbonyl)-7-oxabicyclo[2.2.1]hept-2-ene,
5-(1-ethoxy-1-methylethyloxycarbonyl)-7-oxabicyclo[2.2.1]hept-2-ene,
5-(tetrahydrofuran-2-yloxycarbonyl)-7-oxabicyclo[2.2.1]hept-2-ene, 5-(tetrahydropyran-2-yloxycarbonyl)-7-oxabicyclo[2.2.1]hept-2-ene, 5-(1-adamantyloxycarbonyl)-7-oxabicyclo[2.2.1]hept-2-ene,
5-(2-adamantyloxycarbonyl)-7-oxabicyclo[2.2.1]hept-2-ene,
5-methoxymethyloxycarbonyl-7-oxabicyclo[2.2.1]hept-2-ene,
5-ethoxymethyloxycarbonyl-7-oxabicyclo[2.2.1]hept-2-ene,
5-(n-propoxymethyloxycarbonyl)-7-oxabicyclo[2.2.1]hept-2-ene,
5-isopropoxymethyloxycarbonyl-7-oxabicyclo[2.2.1]hept-2-ene,
5-(n-butoxymethyloxycarbonyl)-7-oxabicyclo[2.2.1]hept-2-ene,
5-(2-methyl-propoxymethyloxycarbonyl)-7-oxabicyclo[2.2.1]hept-2-ene,
5-(tert-butoxymethyloxycarbonyl)-7-oxabicyclo[2.2.1]hept-2-ene,
5-cyclopentyloxymethyloxycarbonyl-7-oxabicyclo[2.2.1]hept-2-ene,
5-cyclohexyloxymethyloxycarbonyl-7-oxabicyclo[2.2.1]hept-2-ene,
5-cyclooctyloxymethyloxycarbonyl-7-oxabicyclo[2.2.1]hept-2-ene,
5-norbonyloxymethyloxycarbonyl-7-oxabicyclo[2.2.1]hept-2-ene,
5-(1-methylcyclopentyloxymethyloxycarbonyl)-7-oxabicyclo[2.2.1]hept-2-ene,
5-(1-ethylcyclopentyloxymethyloxycarbonyl)-7-oxabicyclo[2.2.1]hept-2-ene,
5-(1-methylnorbonyloxymethyloxycarbonyl)-7-oxabicyclo[2.2.1]hept-2-ene,
5-(1-ethylnorbonyloxymethyloxycarbonyl)-7-oxabicyclo[2.2.1]hept-2-ene,
5-(1-ethoxypropyloxymethyloxycarbonyl)-7-oxabicyclo[2.2.1]hept-2-ene,
5-(1-ethoxy-1-methylethyloxymethyloxycarbonyl)-7-oxabicyclo[2.2.1]hept-2-ene,
5-(tetrahydrofuran-2-yloxymethyloxycarbonyl)-7-oxabicyclo[2.2.1]hept-2-ene,
5-(tetrahydropyran-2-yloxymethyloxycarbonyl)-7-oxabicyclo[2.2.1]hept-2-ene,
5-(1-adamantyloxymethyloxycarbonyl)-7-oxabicyclo[2.2.1]hept-2-ene,
5-(2-adamantyloxymethyloxycarbonyl)-7-oxabicyclo[2.2.1]hept-2-ene,
5-methoxycarbonylmethyloxycarbonyl-7-oxabicyclo[2.2.1]hept-2-ene,
5-ethoxycarbonylmethyloxycarbonyl-7-oxabicyclo[2.2.1]hept-2-ene,
5-(n-propoxycarbonylmethyloxycarbonyl)-7-oxabicyclo[2.2.1]hept-2-ene,
5-isopropoxycarbonylmethyloxycarbonyl-7-oxabicyclo[2.2.1]hept-2-ene,
5-(n-butoxycarbonylmethyloxycarbonyl)-7-oxabicyclo[2.2.1]hept-2-ene,
5-isobutoxycarbonylmethyloxycarbonyl-7-oxabicyclo[2.2.1]hept-2-ene,
5-(tert-butoxycarbonylmethyloxycarbonyl)-7-oxabicyclo[2.2.1]hept-2-ene,
5-cyclopentyloxycarbonylmethyloxycarbonyl-7-oxabicyclo[2.2.1]hept-2-ene,
5-cyclohexyloxycarbonylmethyloxycarbonyl-7-oxabicyclo[2.2.1]hept-2-ene,
5-cyclooctyloxycarbonylmethyloxycarbonyl-7-oxabicyclo[2.2.1]hept-2-ene,
5-norbornyloxycarbonylmethyloxycarbonyl-7-oxabicyclo[2.2.1]hept-2-ene,
5-(1-methylcyclopentyloxycarbonylmethyloxycarbonyl)-7-oxabicyclo[2.2.1]hept-2-ene,
5-(1-ethylcyclopentyloxycarbonylmethyloxycarbonyl)-7-oxabicyclo[2.2.1]hept-2-ene,
5-(1-methylnorbonyloxycarbonylmethyloxycarbonyl)-7-oxabicyclo[2.2.1]hept-2-ene,
5-(1-ethylnorbonyloxycarbonylmethyloxycarbonyl)-7-oxabicyclo[2.2.1]hept-2-ene,
5-(1-ethoxypropyloxycarbonylmethyloxycarbonyl)-7-oxabicyclo[2.2.1]hept-2-ene,
5-(1-ethoxy-1-methylethyloxycarbonylmethyloxycarbonyl)-7-oxabicyclo[2.2.1]hept-2-ene,
5-(tetrahydrofuran-2-yloxycarbonylmethyloxycarbonyl)-7-oxabicyclo[2.2.1]hept-2-ene,
5-(tetrahydropyran-2-yloxycarbonylmethyloxycarbonyl)-7-oxabicyclo[2.2.1]hept-2-ene,
5-(1-adamantyloxycarbonylmethyloxycarbonyl)-7-oxabicyclo[2.2.1]hept-2-ene,
5-(2-adamantyloxycarbonylmethyloxycarbonyl)-7-oxabicyclo[2.2.1]hept-2-ene, 5-cyano-7-oxabicyclo[2.2.1]hept-2-ene,
5-cyanomethyl-7-oxabicyclo[2.2.1]hept-2-ene,
5-cyanoethyl-7-oxabicyclo[2.2.1]hept-2-ene,
5-cyanopropyl-7-oxabicyclo[2.2.1]hept-2-ene and the like.

Furthermore, specific examples of the cyclic olefin monomer of the cyclic olefin polymer obtained in the same manner as above in which j=1 and $X^1$ is —$CH_2$— in the repeating structural unit [A] represented by the general formula (1) include
8-methoxycarbonyl-tetracyclo[$4.4.0.1^{2,5}.1^{7,10}$]-3-dodecene,
8-ethoxycarbonyl-tetracyclo[$4.4.0.1^{2,5}.1^{7,10}$]-3-dodecene,
8-(n-propoxycarbonyl)-tetracyclo[$4.4.0.1^{2,5}.1^{7,10}$]-3-dodecene,
8-isopropoxycarbonyl-tetracyclo[$4.4.0.1^{2,5}.1^{7,10}$]-3-dodecene,
8-(n-butoxycarbonyl)-tetracyclo[$4.4.0.1^{2,5}.1^{7,10}$]-3-dodecene,
8-isobutoxycarbonyl-tetracyclo[$4.4.0.1^{2,5}.1^{7,10}$]-3-dodecene,
8-(tert-butoxycarbonyl)-tetracyclo[$4.4.0.1^{2,5}.1^{7,10}$]-3-dodecene,
8-cyclopentyloxycarbonyl-tetracyclo[$4.4.0.1^{2,5}.1^{7,10}$]-3-dodecene,
8-cyclohexyloxycarbonyl-tetracyclo[$4.4.0.1^{2,5}.1^{7,10}$]-3-dodecene,
8-cyclooctyloxycarbonyl-tetracyclo[$4.4.0.1^{2,5}.1^{7,10}$]-3-dodecene,
8-norbonyloxycarbonyl-tetracyclo[$4.4.0.1^{2,5}.1^{7,10}$]-3-dodecene,
8-(1-methylcyclopentyloxycarbonyl)-tetracyclo[$4.4.0.1^{2,5}.1^{7,10}$]-3-dodecene,
8-(1-ethylcyclopentyloxycarbonyl)-tetracyclo[$4.4.0.1^{2,5}.1^{7,10}$]-3-dodecene,
8-(1-methylnorbonyloxycarbonyl)-tetracyclo[$4.4.0.1^{2,5}.1^{7,10}$]-3-do decene,
8-(1-ethylnorbonyloxycarbonyl)-tetracyclo[$4.4.0.1^{2,5}.1^{7,10}$]-3-dodecene,
8-(1-ethoxypropyloxycarbonyl)-tetracyclo[$4.4.0.1^{2,5}.1^{7,10}$]-3-dodecene,
8-(1-ethoxy-1-methylethyloxycarbonyl)-tetracyclo[$4.4.0.1^{2,5}.1^{7,10}$]-3-dodecene,
8-(tetrahydrofuran-2-yloxycarbonyl)-tetracyclo[$4.4.0.1^{2,5}.1^{7,10}$]-3-dodecene,
8-(tetrahydropyran-2-yloxycarbonyl)-tetracyclo[$4.4.0.1^{2,5}.1^{7,10}$]-3-dodecene, 8-(1-adamantyloxycarbonyl)-tetracyclo[4.4.0.1$^{2,5}$.1$^{7,10}$]-3-dodecene,
8-(2-adamantyloxycarbonyl)-tetracyclo[4.4.0.1$^{2,5}$.1$^{7,10}$]-3-dodecene,
8-methoxymethyloxycarbonyl-tetracyclo[4.4.0.1$^{2,5}$.1$^{7,10}$]-3-dodecene,
8-ethoxymethyloxycarbonyl-tetracyclo[4.4.0.1$^{2,5}$.1$^{7,10}$]-3-dodecene,
8-(n-propoxymethyloxycarbonyl)-tetracyclo[4.4.0.1$^{2,5}$.1$^{7,10}$]-3-dodecene,
8-isopropoxymethyloxycarbonyl-tetracyclo[4.4.0.1$^{2,5}$.1$^{7,10}$]-3-dodecene,
8-(n-butoxymethyloxycarbonyl)-tetracyclo[4.4.0.1$^{2,5}$.1$^{7,10}$]-3-dodecene,
8-isobutoxymethyloxycarbonyl-tetracyclo[4.4.0.1$^{2,5}$.1$^{7,10}$]-3-dodec ene,
8-(tert-butoxymethyloxycarbonyl)-tetracyclo[4.4.0.1$^{2,5}$.1$^{7,10}$]-3-dodecene,
8-cyclopentyloxymethyloxycarbonyl-tetracyclo[4.4.0.1$^{2,5}$.1$^{7,10}$]-3-dodecene,
8-cyclohexyloxymethyloxycarbonyl-tetracyclo[4.4.0.1$^{2,5}$.1$^{7,10}$]-3-dodecene,
8-cyclooctyloxymethyloxycarbonyl-tetracyclo[4.4.0.1$^{2,5}$.1$^{7,10}$]-3-dodecene,
8-norbonyloxymethyloxycarbonyl-tetracyclo[4.4.0.1$^{2,5}$.1$^{7,10}$]-3-dodecene,
8-(1-methylcyclopentyloxymethyloxycarbonyl)-tetracyclo[4.4.0.1$^{2,5}$.1$^{7,10}$]-3-dodecene,
8-(1-ethylcyclopentyloxymethyloxycarbonyl)-tetracyclo[4.4.0.1$^{2,5}$.1$^{7,10}$]-3-dodecene,
8-(1-methylnorbonyloxymethyloxycarbonyl)-tetracyclo[4.4.0.1$^{2,5}$.1$^{7,10}$]-3-dodecene,
8-(1-ethylnorbonyloxymethyloxycarbonyl)-tetracyclo[4.4.0.1$^{2,5}$.1$^{7,10}$]-3-dodecene,
8-(1-ethoxypropyloxymethyloxycarbonyl)-tetracyclo[4.4.0.1$^{2,5}$.1$^{7,10}$]-3-dodecene,
8-(1-ethoxy-1-methylethyloxymethyloxycarbonyl)-tetracyclo[4.4.0.1$^{2,5}$.1$^{7,10}$]-3-dodecene,
8-(tetrahydrofuran-2-yloxymethyloxycarbonyl)-tetracyclo[4.4.0.1$^{2,5}$.1$^{7,10}$]-3-dodecene,
8-(tetrahydropyran-2-yloxymethyloxycarbonyl)-tetracyclo[4.4.0.1$^{2,5}$.1$^{7,10}$]-3-dodecene,
8-(1-adamantyloxymethyloxycarbonyl)-tetracyclo[4.4.0.1$^{2,5}$.1$^{7,10}$]-3-dodecene,
8-(2-adamantyloxymethyloxycarbonyl)-tetracyclo[4.4.0.1$^{2,5}$.1$^{7,10}$]-3-dodecene,
8-methoxycarbonylmethyloxycarbonyl-tetracyclo[4.4.0.1$^{2,5}$.1$^{7,10}$]-3-dodecene,
8-ethoxycarbonylmethyloxycarbonyl-tetracyclo[4.4.0.1$^{2,5}$.1$^{7,10}$]-3-dodecene,
8-(n-propoxycarbonylmethyloxycarbonyl)-tetracyclo[4.4.0.1$^{2,5}$.1$^{7,10}$]-3-dodecene,
8-isopropoxycarbonylmethyloxycarbonyl-tetracyclo[4.4.0.1$^{2,5}$.1$^{7,10}$]-3-dodecene,
8-(n-butoxycarbonylmethyloxycarbonyl)-tetracyclo[4.4.0.1$^{2,5}$.1$^{7,10}$]-3-dodecene,
8-isobutoxycarbonylmethyloxycarbonyl-tetracyclo[4.4.0.1$^{2,5}$.1$^{7,10}$]-3-dodecene,
8-(tert-butoxycarbonylmethyloxycarbonyl)-tetracyclo[4.4.0.1$^{2,5}$.1$^{7,10}$]-3-dodecene,
8-cyclopentyloxycarbonylmethyloxycarbonyl-tetracyclo[4.4.0.1$^{2,5}$.1$^{7,10}$]-3-dodecene,
8-cyclohexyloxycarbonylmethyloxycarbonyl-tetracyclo[4.4.0.1$^{2,5}$.1$^{7,10}$]-3-dodecene,
8-cyclooctyloxycarbonylmethyloxycarbonyl-tetracyclo[4.4.0.1$^{2,5}$.1$^{7,10}$]-3-dodecene,
8-norbonyloxycarbonylmethyloxycarbonyl-tetracyclo[4.4.0.1$^{2,5}$.1$^{7,10}$]-3-dodecene,
8-(1-methylcyclopentyloxycarbonylmethyloxycarbonyl)-tetracyclo[4.4.0.1$^{2,5}$.1$^{7,10}$]-3-dodecene,
8-(1-ethylcyclopentyloxycarbonylmethyloxycarbonyl)-tetracyclo[4.4.0.1$^{2,5}$.1$^{7,10}$]-3-dodecene,
8-(1-methylnorbonyloxycarbonylmethyloxycarbonyl)-tetracyclo[4.4.0.1$^{2,5}$.1$^{7,10}$]-3-dodecene,
8-(1-ethylnorbonyloxycarbonylmethyloxycarbonyl)-tetracyclo[4.4.0.1$^{2,5}$.1$^{7,10}$]-3-dodecene,
8-(1-ethoxypropyloxycarbonylmethyloxycarbonyl)-tetracyclo[4.4.0.1$^{2,5}$.1$^{7,10}$]-3-dodecene,
8-(1-ethoxy-1-methylethyloxycarbonylmethyloxycarbonyl)-tetracyclo[4.4.0.1$^{2,5}$.1$^{7,10}$]-3-dodecane,
8-(tetrahydrofuran-2-yloxycarbonylmethyloxycarbonyl)-tetracyclo[4.4.0.1$^{2,5}$.1$^{7,10}$]-3-dodecene,
8-(tetrahydropyran-2-yloxycarbonylmethyloxycarbonyl)-tetracyclo[4.4.0.1$^{2,5}$.1$^{7,10}$]-3-dodecene,
8-(1-adamantyloxycarbonylmethyloxycarbonyl)-tetracyclo[4.4.0.1$^{2,5}$.1$^{7,10}$]-3-dodecene,
8-(2-adamantyloxycarbonylmethyloxycarbonyl)-tetracyclo[4.4.0.1$^{2,5}$.1$^{7,10}$]-3-dodecene,
8-cyano-tetracyclo[4.4.0.1$^{2,5}$.1$^{7,10}$]-3-dodecene,
8-cyanomethyl-tetracyclo[4.4.0.1$^{2,5}$.1$^{7,10}$]-3-dodecene,
8-cyanoethyl-tetracyclo[4.4.0.1$^{2,5}$.1$^{7,10}$]-3-dodecene,
8-cyanopropyl-tetracyclo[4.4.0.1$^{2,5}$.1$^{7,10}$]-3-dodecene and the like.

Furthermore, specific examples of the cyclic olefin monomer of the cyclic olefin polymer obtained in the same manner as above in which j=1 and X$^1$ is —O— in the repeating structural unit [A] represented by the general formula (1) include 8-methoxycarbonyl-11-oxatetracyclo[4.4.0.1$^{2,5}$.1$^{7,10}$]-3-dodecene,
8-ethoxycarbonyl-11-oxatetracyclo[4.4.0.1$^{2,5}$.1$^{7,10}$]-3-dodecene,
8-(n-propoxycarbonyl)-11-oxatetracyclo[4.4.0.1$^{2,5}$.1$^{7,10}$]-3-dodecene,
8-isopropoxycarbonyl-11-oxatetracyclo[4.4.0.1$^{2,5}$.1$^{7,10}$]-3-dodecene,
8-(n-butoxycarbonyl)-11-oxatetracyclo[4.4.0.1$^{2,5}$.1$^{7,10}$]-3-dodecene
8-isobutoxycarbonyl-11-oxatetracyclo[4.4.0.1$^{2,5}$.1$^{7,10}$]-3-dodecene,
8-(tert-butoxycarbonyl)-11-oxatetracyclo[4.4.0.1$^{2,5}$.1$^{7,10}$]-3-dodecene,
8-cyclopentyloxycarbonyl-11-oxatetracyclo[4.4.0.1$^{2,5}$.1$^{7,10}$]-3-dodecene,
8-cyclohexyloxycarbonyl-11-oxatetracyclo[4.4.0.1$^{2,5}$.1$^{7,10}$]-3-dodecene,
8-cyclooctyloxycarbonyl-11-oxatetracyclo[4.4.0.1$^{2,5}$.1$^{7,10}$]-3-dodecene,
8-norbonyloxycarbonyl-11-oxatetracyclo[4.4.0.1$^{2,5}$.1$^{7,10}$]-3-dodecene,
8-(1-methylcyclopentyloxycarbonyl)-11-oxatetracyclo[4.4.0.1$^{2,5}$.1$^{7,10}$]-3-dodecene,
8-(1-ethylcyclopentyloxycarbonyl)-11-oxatetracyclo[4.4.0.1$^{2,5}$.1$^{7,10}$]-3-dodecene,
8-(1-methylnorbonyloxycarbonyl)-11-oxatetracyclo[4.4.0.1$^{2,5}$.1$^{7,10}$]-3-dodecene,
8-(1-ethylnorbonyloxycarbonyl)-11-oxatetracyclo[4.4.0.1$^{2,5}$.1$^{7,10}$]-3-dodecene,
8-(1-ethoxypropyloxycarbonyl)-11-oxatetracyclo[4.4.0.1$^{2,5}$.1$^{7,10}$]-3-dodecene,
8-(1-ethoxy-1-methylethyloxycarbonyl)-11-oxatetracyclo[4.4.0.1$^{2,5}$.1$^{7,10}$]-3-dodecene, 8-(tetrahydrofuran-2-yloxycarbonyl)-11-oxatetracyclo[4.4.0.1$^{2,5}$.1$^{7,10}$]-3-dodecene,
8-(tetrahydropyran-2-yloxycarbonyl)-11-oxatetracyclo[4.4.0.1$^{2,5}$.1$^{7,10}$]-3-dodecene,
8-(1-adamantyloxycarbonyl)-11-oxatetracyclo[4.4.0.1$^{2,5}$.1$^{7,10}$]-3-dodecene,
8-(2-adamantyloxycarbonyl)-11-oxatetracyclo[4.4.0.1$^{2,5}$.1$^{7,10}$]-3-dodecene,
8-methoxymethyloxycarbonyl-11-oxatetracyclo[4.4.0.1$^{2,5}$.1$^{7,10}$]-3-dodecene,
8-ethoxymethyloxycarbonyl-11-oxatetracyclo[4.4.0.1$^{2,5}$.1$^{7,10}$]-3-dodecene,
8-(n-propoxymethyloxycarbonyl)-11-oxatetracyclo[4.4.0.1$^{2,5}$.1$^{7,10}$]-3-dodecene,
8-isopropoxymethyloxycarbonyl-11-oxatetracyclo[4.4.0.1$^{2,5}$.1$^{7,10}$]-3-dodecene,
8-(n-butoxymethyloxycarbonyl)-11-oxatetracyclo[4.4.0.1$^{2,5}$.1$^{7,10}$]-3-dodecene,
8-isobutoxymethyloxycarbonyl-11-oxatetracyclo[4.4.0.1$^{2,5}$.1$^{7,10}$]-3-dodecene,
8-(tert-butoxymethyloxycarbonyl)-11-oxatetracyclo[4.4.0.1$^{2,5}$.1$^{7,10}$]-3-dodecene,
8-cyclopentyloxymethyloxycarbonyl-11-oxatetracyclo[4.4.0.1$^{2,5}$.1$^{7,10}$]-3-dodecene,
8-cyclohexyloxymethyloxycarbonyl-1'-oxatetracyclo[4.4.0.1$^{2,5}$.1$^{7,10}$]-3-dodecene,
8-cyclooctyloxymethyloxycarbonyl-11-oxatetracyclo[4.4.0.1$^{2,5}$.1$^{7,10}$]-3-dodecene,
8-norbonyloxymethyloxycarbonyl-11-oxatetracyclo[4.4.0.1$^{2,5}$.1$^{7,10}$]-3-dodecene,
8-(1-methylcyclopentyloxymethyloxycarbonyl)-11-oxatetracyclo[4.4.0.1$^{2,5}$.1$^{7,10}$]-3-dodecene,
8-(1-ethylcyclopentyloxymethyloxycarbonyl)-11-oxatetracyclo[4.4.0.1$^{2,5}$.1$^{7,10}$]-3-dodecene,
8-(1-methylnorbonyloxymethyloxycarbonyl)-11-oxatetracyclo[4.4.0.1$^{2,5}$.1$^{7,10}$]-3-dodecene,
8-(1-ethylnorbonyloxymethyloxycarbonyl)-11-oxatetracyclo[4.4.0.1$^{2,5}$.1$^{7,10}$]-3-dodecene,
8-(1-ethoxypropyloxymethyloxycarbonyl)-11-oxatetracyclo[4.4.0.1$^{2,5}$.1$^{7,10}$]-3-dodecene,
8-(1-ethoxy-1-methylethyloxymethyloxycarbonyl)-11-oxatetracyclo[4.4.0.1$^{2,5}$.1$^{7,10}$]-3-dodecene,
8-(tetrahydrofuran-2-yloxymethyloxycarbonyl)-11-oxatetracyclo[4.4.0.1$^{2,5}$.1$^{7,10}$]-3-dodecene,
8-(tetrahydropyran-2-yloxymethyloxycarbonyl)-11-oxatetracyclo[4.4.0.1$^{2,5}$.1$^{7,10}$]-3-dodecene,
8-(1-adamantyloxymethyloxycarbonyl)-11-oxatetracyclo[4.4.0.1$^{2,5}$.1$^{7,10}$]-3-dodecene,
8-(2-adamantyloxymethyloxycarbonyl)-11-oxatetracyclo[4.4.0.1$^{2,5}$.1$^{7,10}$]-3-dodecene,
8-methoxycarbonylmethyloxycarbonyl-1'-oxatetracyclo[4.4.0.1$^{2,5}$.1$^{7,10}$]-3-dodecene,
8-ethoxycarbonylmethyloxycarbonyl-11-oxatetracyclo[4.4.0.1$^{2,5}$.1$^{7,10}$]-3-dodecene,
8-(n-propoxycarbonylmethyloxycarbonyl)-11-oxatetracyclo[4.4.0.1$^{2,5}$.1$^{7,10}$]-3-dodecene,
8-isopropoxycarbonylmethyloxycarbonyl-11-oxatetracyclo[4.4.0.1$^{2,5}$.1$^{7,10}$]-3-dodecene,
8-(n-butoxycarbonylmethyloxycarbonyl)-11-oxatetracyclo[4.4.0.1$^{2,5}$.1$^{7,10}$]-3-dodecene,
8-isobutoxycarbonylmethyloxycarbonyl-11-oxatetracyclo[4.4.0.1$^{2,5}$.1$^{7,10}$]-3-dodecene,
8-(tert-butoxycarbonylmethyloxycarbonyl)-11-oxatetracyclo[4.4.0.1$^{2,5}$.1$^{7,10}$]-3-dodecene,
8-cyclopentyloxycarbonylmethyloxycarbonyl-11-oxatetracyclo[4.4.0.1$^{2,5}$.1$^{7,10}$]-3-dodecene,
8-cyclohexyloxycarbonylmethyloxycarbonyl-11-oxatetracyclo[4.4.0.1$^{2,5}$.1$^{7,10}$]-3-dodecene,
8-cyclooctyloxycarbonylmethyloxycarbonyl-11-oxatetracyclo[4.4.0.1$^{2,5}$.1$^{7,10}$]-3-dodecene,
8-norbonyloxycarbonylmethyloxycarbonyl-11-oxatetracyclo[4.4.0.1$^{2,5}$.1$^{7,10}$]-3-dodecene,
8-(1-methylcyclopentyloxycarbonylmethyloxycarbonyl)-11-oxatetracyclo[4.4.0.1$^{2,5}$.1$^{7,10}$]-3-dodecene,
8-(1-ethylcyclopentyloxycarbonylmethyloxycarbonyl)-11-oxatetracyclo[4.4.0.1$^{2,5}$.1$^{7,10}$]-3-dodecene,
8-(1-methylnorbonyloxycarbonylmethyloxycarbonyl)-11-oxatetracyclo[4.4.0.1$^{2,5}$.1$^{7,10}$]-3-dodecene,
8-(1-ethylnorbonyloxycarbonylmethyloxycarbonyl)-11-oxatetracyclo[4.4.0.1$^{2,5}$.1$^{7,10}$]-3-dodecene,
8-(1-ethoxypropyloxycarbonylmethyloxycarbonyl)-11-oxatetracyclo[4.4.0.1$^{2,5}$.1$^{7,10}$]-3-dodecene,
8-(1-ethoxy-1-methylethyloxycarbonylmethyloxycarbonyl)-11-oxatetracyclo[4.4.0.1$^{2,5}$.1$^{7,10}$]-3-dodecene,
8-(tetrahydrofuran-2-yloxycarbonylmethyloxycarbonyl)-11-oxatetracyclo[4.4.0.1$^{2,5}$.1$^{7,10}$]-3-dodecene,
8-(tetrahydropyran-2-yloxycarbonylmethyloxycarbonyl)-11-oxatetracyclo[4.4.0.1$^{2,5}$.1$^{7,10}$]-3-dodecene,
8-(1-adamantyloxycarbonylmethyloxycarbonyl)-11-oxatetracyclo[4.4.0.1$^{2,5}$.1$^{7,10}$]-3-dodecene,
8-(2-adamantyloxycarbonylmethyloxycarbonyl)-11-oxatetracyclo[4.4.0.1$^{2,5}$.1$^{7,10}$]-3-dodecene,
8-cyano-11-oxatetracyclo[4.4.0.1$^{2,5}$.1$^{7,10}$]-3-dodecene,
8-cyanomethyl-11-oxatetracyclo[4.4.0.1$^{2,5}$.1$^{7,10}$]-3-dodecene,
8-cyanoethyl-11-oxatetracyclo[4.4.0.1$^{2,5}$.1$^{7,10}$]-3-dodecene,
8-cyanopropyl-11-oxatetracyclo[4.4.0.1$^{2,5}$.1$^{7,10}$]-3-dodecene and the like.

Furthermore, there may be cited a bicyclic olefin monomer and a tetracyclic olefin monomer in which $X^1$ of the general formula (1) is replaced with thia, aza, methylaza, phospha or methylphospha.

Specific examples of the cyclic olefin monomer of the cyclic olefin polymer obtained by polymerization and hydrogenation in which $X^2$ is —CH$_2$— in the repeating structural unit [B] represented by the general formula (2) include
4-oxatricyclo[5.2.1.0$^{2,6}$]deca-8-ene-3-one,
4-oxa-5,5-dimethyltricyclo[5.2.1.0$^{2,6}$]deca-8-ene-3-one,
4-oxa-2,6-dimethyltricyclo[5.2.1.0$^{2,6}$]deca-8-ene-3-one,
4-oxa-2,5,5,6-tetramethyltricyclo[5.2.1.0$^{2,6}$]deca-8-ene-3-one and the like.

Furthermore, specific examples of the cyclic olefin monomer of the cyclic olefin polymer obtained in the same manner as above in which $X^2$ is —O— include
4,10-dioxatricyclo[5.2.1.0$^{2,6}$]deca-8-ene-3-one,
4,10-dioxa-5,5-dimethyltricyclo[5.2.1.0$^{2,6}$]deca-8-ene-3-one,
4,10-dioxa-2,6-dimethyltricyclo[5.2.1.0$^{2,6}$]deca-8-ene-3-one,
4,10-dioxa-2,5,5,6-tetramethyltricyclo[5.2.1.0$^{2,6}$]deca-8-ene-3-one and the like.

Furthermore, there may be cited a tricyclic olefin monomer in which $X^2$ of the general formula (2) is replaced with thia, aza, methylaza, phospha or methylphospha.

Specific examples of the cyclic olefin monomer of the cyclic olefin polymer obtained by polymerization and hydrogenation in which m=0 and $X^3$ is —CH$_2$— in the repeating structural unit [C] represented by the general formula (3) include
5-hydroxycarbonyl-bicyclo[2.2.1]hept-2-ene,
5-hydroxycarbonylmethyl-bicyclo[2.2.1]hept-2-ene,
5-hydroxycarbonylethyl-bicyclo[2.2.1]hept-2-ene, 5-hydroxycarbonylpropyl-bicyclo[2.2.1]hept-2-ene,
5-hydroxycarbonylbutyl-bicyclo[2.2.1]hept-2-ene and the like.

Furthermore, specific examples of the cyclic olefin monomer of the cyclic olefin polymer obtained in the same manner as above in which m=0 and $X^3$ is —O— in the repeating structural unit [C] represented by the general formula (3) include
5-hydroxycarbonyl-7-oxabicyclo[2.2.1]hept-2-ene,
5-hydroxycarbonylmethyl-7-oxabicyclo[2.2.1]hept-2-ene,
5-hydroxycarbonylethyl-7-oxabicyclo[2.2.1]hept-2-ene,
5-hydroxycarbonylpropyl-7-oxabicyclo[2.2.1]hept-2-ene,
5-hydroxycarbonylbutyl-7-oxabicyclo[2.2.1]hept-2-ene and the like.

Furthermore, specific examples of the cyclic olefin monomer of the cyclic olefin polymer obtained in the same manner as above in which m=1 and $X^3$ is —$CH_2$— in the repeating structural unit [C] represented by the general formula (3) include
8-hydroxycarbonyl-tetracyclo[$4.4.0.1^{2,5}.1^{7,10}$]-3-dodecene,
8-hydroxycarbonylmethyl-tetracyclo[$4.4.0.1^{2,5}.1^{7,10}$]-3-dodecene,
8-hydroxycarbonylethyl-tetracyclo[$4.4.0.1^{2,5}.1^{7,10}$]-3-dodecene,
8-hydroxycarbonylpropyl-tetracyclo[$4.4.0.1^{2,5}.1^{7,10}$]-3-dodecene,
8-hydroxycarbonylbutyl-tetracyclo[$4.4.0.1^{2,5}.1^{7,10}$]-3-dodecene and the like.

Furthermore, specific examples of the cyclic olefin monomer of the cyclic olefin polymer obtained in the same manner as above in which m=1 and $X^3$ is —O— in the repeating structural unit [C] represented by the general formula (3) include
8-hydroxycarbonyl-11-oxatetracyclo[$4.4.0.1^{2,5}.1^{7,10}$]-3-dodecene,
8-hydroxycarbonylmethyl-11-oxatetracyclo[$4.4.0.1^{2,5}.1^{7,10}$]-3-dodecene,
8-hydroxycarbonylethyl-1'-oxatetracyclo[$4.4.0.1^{2,5}.1^{7,10}$]-3-dodecene,
8-hydroxycarbonylpropyl-1'-oxatetracyclo[$4.4.0.1^{2,5}.1^{7,10}$]-3-dodecene,
8-hydroxycarbonylbutyl-11-oxatetracyclo[$4.4.0.1^{2,5}.1^{7,10}$]-3-dodecene and the like.

The catalyst used for the polymerization reaction of the cyclic olefin monomer is not particularly limited as long as it is capable of conducting ring-opening metathesis polymerization of the aforementioned cyclic olefin monomer, and examples thereof include a ring-opening metathesis catalyst consisting of an organic transition metal alkylidene complex such as molybdenum, tungsten, ruthenium, and a ring-opening metathesis catalyst consisting of a combination of an organic transition metal complex and Lewis acid as a cocatalyst.

For example, there can also be used a ring-opening metathesis catalyst consisting of a tungsten halogen complex such as W(N-2,6-$Pr^i_2C_6H_3$)(thf)(OBu$^t$)$_2$Cl$_2$, W(N-2,6-$Pr^i_2C_6H_3$)(thf)(OCMe$_2$CF$_3$)$_2$Cl$_2$; or a molybdenum halogen complex such as Mo(N-2,6-$Pr^i_2C_6H_3$)(thf)(OBu$^t$)$_2$Cl$_2$, Mo(N-2,6-$Pr^i_2C_6H_3$)(thf)(OCMe$_2$CF$_3$)$_2$Cl$_2$ (in the formula, $Pr^i$ represents an iso-propyl group, Bu$^t$ represents a tert-butyl group, and thf represents tetrahydrofuran), and a cocatalyst such as an organoaluminum compound, an organotin compound, or an organometallic compound of lithium, sodium, magnesium, zinc, cadmium, boron or the like.

Further, there can also be used a ring-opening metathesis catalyst consisting of a combination of an inorganic transition metal halogen compound such as MoCl$_6$, WCl$_6$, ReCl$_5$, TiCl$_4$, RuCl$_3$, IrCl$_3$ and the above-mentioned Lewis acid as a cocatalyst in the presence of an electron-donating compound such as an amine compound, an ester compound, an ether compound.

In the present invention, particularly, a catalyst capable of polymerizing the cyclic olefin monomer containing a hetero atom and having high polarity can be efficiently removed. For example, when an organic transition metal alkylidene complex such as tungsten, molybdenum, ruthenium is used for a ring-opening metathesis polymerization catalyst, purification can be conducted with good efficiency.

Furthermore, specific examples of the ring-opening metathesis polymerization catalyst of the organic transition metal alkylidene complex include tungsten alkylidene catalysts such as W(N-2,6-$Pr^i_2C_6H_3$)(CHBu$^t$)(OBu$^t$)$_2$, W(N-2,6-$Pr^i_2C_6H_3$)(CHBu$^t$)(OCMe$_2$CF$_3$)$_2$, W(N-2,6-$Pr^i_2C_6H_3$)(CHBu$^t$)(OCMe(CF$_3$)$_2$)$_2$, W(N-2,6-$Pr^i_2C_6H_3$)(CHCMe$_2$Ph)(OBu$^t$)$_2$, W(N-2,6-$Pr^i_2C_6H_3$)(CHCMe$_2$Ph)(OCMe$_2$CF$_3$)$_2$, W(N-2,6-$Pr^i_2C_6H_3$)(CHCMe$_2$Ph)(OCMe (CF$_3$)$_2$)$_2$, W(N-2,6-$Pr^i_2C_6H_3$)(CHCMe$_2$Ph)(OC(CF$_3$)$_3$)$_2$, W(N-2,6-Me$_2$C$_6$H$_3$)(CHCMe$_2$Ph)(OC(CF$_3$)$_3$)$_2$ (in the formula, $Pr^i$ represents an iso-propyl group, Bu$^t$ represents a tert-butyl group, Me represents a methyl group, and Ph represents a phenyl group); tungsten alkylidene catalysts such as W(N-2,6-Me$_2$C$_6$H$_3$)(CHCHCMePh)(OBu$^t$)$_2$(PMe$_3$), W(N-2,6-Me$_2$C$_6$H$_3$)(CHCHCMe$_2$)(OBu$^t$)$_2$(PMe$_3$), W(N-2,6-Me$_2$C$_6$H$_3$)(CHCHCPh$_2$)(OBu$^t$)$_2$(PMe$_3$), W(N-2,6-Me$_2$C$_6$H$_3$)(CHCHCMePh)(OCMe$_2$(CF$_3$))$_2$(PMe$_3$), W(N-2,6-Me$_2$C$_6$H$_3$)(CHCHCMe$_2$)(OCMe$_2$(CF$_3$))$_2$(PMe$_3$), W(N-2,6-Me$_2$C$_6$H$_3$)(CHCHCPh$_2$)(OCMe$_2$(CF$_3$))$_2$(PMe$_3$), W(N-2,6-Me$_2$C$_6$H$_3$)(CHCHCMe$_2$)(OCMe(CF$_3$)$_2$)$_2$(PMe$_3$), W(N-2,6-Me$_2$C$_6$H$_3$)(CHCHCMe$_2$)(OCMe(CF$_3$)$_2$)$_2$(PMe$_3$), W(N-2,6-Me$_2$C$_6$H$_3$)(CHCHCPh$_2$)(OCMe(CF$_3$)$_2$)$_2$(PMe$_3$), W(N-2,6-$Pr^i_2C_6H_3$)(CHCHCMePh)(OCMe$_2$(CF$_3$))$_2$(PMe$_3$), W(N-2,6-$Pr^i_2C_6H_3$)(CHCHCMePh)(OCMe (CF$_3$)$_2$)$_2$(PMe$_3$), W(N-2,6-$Pr^i_2C_6H_3$)(CHCHCMePh)(OPh)$_2$(PMe$_3$) (in the formula, $Pr^i$ represents an iso-propyl group, Bu$^t$ represents a tert-butyl group, Me represents a methyl group, and Ph represents a phenyl group); molybdenum alkylidene catalysts such as Mo(N-2,6-$Pr^i_2C_6H_3$)(CHBu$^t$)(OBu$^t$)$_2$, Mo(N-2,6-$Pr^i_2C_6H_3$)(CHBu$^t$)(OCMe$_2$CF$_3$)$_2$, Mo(N-2,6-$Pr^i_2C_6H_3$)(CHBu$^t$)(OCMe (CF$_3$)$_2$)$_2$, Mo(N-2,6-$Pr^i_2C_6H_3$)(CHBu$^t$)(OC(CF$_3$)$_3$)$_2$, Mo(N-2,6-$Pr^i_2C_6H_3$)(CHCMe$_2$Ph)(OBu$^t$)$_2$, Mo(N-2,6-$Pr^i_2C_6H_3$)(CHCMe$_2$Ph)(OCMe$_2$CF$_3$)$_2$, Mo(N-2,6-$Pr^i_2C_6H_3$)(CHCMe$_2$Ph)(OCMe (CF$_3$)$_2$)$_2$, Mo(N-2,6-$Pr^i_2C_6H_3$)(CHCMe$_2$Ph)(OC(CF$_3$)$_3$)$_2$, Mo(N-2,6-Me$_2$C$_6$H$_3$)(CHCMe$_2$Ph)(OBu$^t$)$_2$, Mo(N-2,6-Me$_2$C$_6$H$_3$)(CHCMe$_2$Ph)(OCMe$_2$CF$_3$)$_2$, Mo(N-2,6-Me$_2$C$_6$H$_3$)(CHCMe$_2$Ph)(OCMe (CF$_3$)$_2$)$_2$, Mo(N-2,6-Me$_2$C$_6$H$_3$)(CHCMe$_2$Ph)(OC(CF$_3$)$_3$)$_2$ (in the formula, $Pr^i$ represents an iso-propyl group, Bu$^t$ represents a tert-butyl group, Me represents a methyl group, and Ph represents a phenyl group); and ruthenium alkylidene catalysts such as Ru(P(C$_6$H$_{11}$)$_3$)$_2$(CHPh)Cl$_2$ (in the formula, Ph represents a phenyl group). The above ring-opening metathesis catalysts may be used singly or two or more kinds may be used in combination.

Examples of the metal component of the polymerization catalyst to be removed in the method for purifying a polymer of the present invention include transition metals such as molybdenum, tungsten, rhenium, iridium, tantalum, ruthenium, vanadium, titanium, palladium, rhodium. Preferably used are molybdenum, tungsten and ruthenium.

In the polymerization reaction, as the molar ratio of the cyclic olefin monomer to the ring-opening metathesis polymerization catalyst of the organic transition metal alkylidene complex, the amount of the cyclic olefin monomer is from 10 to 50,000 equivalents, preferably from 50 to 30,000 equivalents, and more preferably from 100 to 20,000 equivalents, based on 1 mole of the ring-opening metathesis polymerization catalyst.

For the polymerization reaction, a solvent may be used or may not be used. Examples of the solvent include ethers such as tetrahydrofuran, diethyl ether, dibutyl ether, dimethoxyethane, dioxane; aromatic hydrocarbons such as benzene, toluene, xylene, ethylbenzene; aliphatic hydrocarbons such as pentane, hexane, heptane; aliphatic cyclic hydrocarbons such as cyclopentane, cyclohexane, methylcyclohexane, dimethylcyclohexane, decalin; halogenated hydrocarbons such as methylene dichloride, dichloroethane, dichloroethylene, tetrachloroethane, chlorobenzene, trichlorobenzene and the like; and esters such as methyl acetate, ethyl acetate. Two or more kinds thereof may be used in combination.

The polymerization reaction may be carried out in the presence of a chain transfer agent such as an olefin and a diene. Examples of the olefin used as a chain transfer agent include α-olefins such as ethylene, propylene, butene, pentene, hexene, octene; and silicon-containing olefins such as vinyltrimethylsilane, allyltrimethylsilane, allyltriethylsilane, allyltriisopropylsilane, and example of the diene include non-conjugated dienes such as 1,4-pentadiene, 1,5-hexadiene, 1,6-heptadiene. Furthermore, these olefins or dienes may be used singly, or two or more kinds thereof may be used in combination.

Regarding the amount of the olefin or diene that coexists in the present invention, the amount of the olefin or diene is preferably in the range of 0.001 to 1,000 equivalents and more preferably in the range of 0.01 to 100 equivalents, based on 1 mole of the cyclic olefin monomer. Furthermore, the amount of the olefin or diene is preferably in the range of 0.1 to 2,000 equivalents and more preferably in the range of 1 to 1,000 equivalents, based on 1 mole of the ring-opening metathesis polymerization catalyst. When these ratios are optionally determined, the size of the molecular weight may be set, the amount of the ring-opening metathesis polymerization catalyst used for the polymerization reaction is reduced by the use of a chain transfer agent, and the efficiency of removal of metals is increased.

The monomer concentration of the polymerization reaction is different depending on the reactivity and the solubility of the cyclic olefin monomers in a polymerization solvent or the like, but the concentration of the cyclic olefin monomer is usually in the range of 0.001 to 3 kg/kg, preferably in the range of 0.01 to 2 kg/kg and further preferably in the range of 0.02 to 1 kg/kg, based on 1 kg of the solvent. The reaction temperature is different depending on the kind and amount of the cyclic olefin monomer and ring-opening metathesis catalyst, but the reaction temperature is usually from −30 to 150 degrees centigrade, preferably from 0 to 120 degrees centigrade and further preferably from 15 to 100 degrees centigrade. The reaction time is usually from 1 minute to 10 hours, preferably from 5 minutes to 8 hours and further preferably from 10 minutes to 6 hours.

After the polymerization reaction, the reaction can be terminated with aldehydes such as butylaldehyde, ketones such as acetone, and alcohols such as methanol to obtain a ring-opening metathesis polymer solution.

The aforementioned cyclic olefin polymer is obtained by subjecting the cyclic olefin polymer obtained in the aforementioned ring-opening metathesis polymerization to a hydrogenation reaction using a hydrogenation catalyst in the presence of hydrogen. In the hydrogenation reaction, either a homogeneous catalyst or a heterogeneous catalyst may be good as long as the catalyst is used for hydrogenating the double bonds in the main chain of the cyclic olefin polymer containing a hetero atom. Also, an electron-donating compound such as amine, alcohol may be used together.

Specific examples of the heterogeneous catalyst among hydrogenation catalysts include metal-supported catalysts in which a metal such as palladium, platinum, nickel, rhodium, ruthenium is supported on a carrier such as carbon, silica, alumina, titania, magnesia, diatomaceous earth, synthetic zeolite. Examples of the homogeneous catalyst include nickel naphthenate/triethylaluminum, nickel acetylacetonate/triisobutylaluminum, cobalt octenoate/n-butyllithium, titanocene dichloride/diethylaluminum chloride, rhodium acetate, dichlorobis(triphenylphosphine)palladium, chlorotris(triphenylphosphine)rhodium, dihydridotetrakis(triphenylphosphine)ruthenium and the like.

Furthermore, hydrogenation may also be carried out by using a hydrogenation catalyst consisting of an organometallic complex and an amine compound in the presence of hydrogen. Moreover, specific examples of the organometallic complex include dichlorobis(triphenylphosphine)nickel, dichlorobis(triphenylphosphine)palladium, dichlorobis(triphenylphosphine)platinum, chlorotris(triphenylphosphine)rhodium, dichlorotris(triphenylphosphine)osmium, dichlorohydridobis(triphonylphosphine)iridium, dichlorotris(triphenylphosphine)ruthenium, dichlorotetrakis(triphenylphosphine)ruthenium, trichloronitrosylbis(triphenylphosphine)ruthenium, dichlorobis(acetonitrile)bis(triphenylphosphine)ruthenium, dichlorobis(tetrahydrofuran)bis(triphenylphosphine)ruthenium, chlorohydrido(toluene)tris(triphenylphosphine)ruthenium, chlorohydridocarbonyltris(triphenylphosphine)ruthenium, chlorohydridocarbonyltris(diethylphenylphosphine)ruthenium, chlorohydridonitrosyltris(triphenylphosphine)ruthenium, dichlorotris(trimethylphosphine)ruthenium, dichlorotris(triethylphosphine)ruthenium, dichlorotris(tricyclohexylphosphine)ruthenium, dichlorotris(triphenylphosphine)ruthenium, dichlorotris(trimethyldiphenylphosphine)ruthenium, dichlorotris(tridimethylphenylphosphine)ruthenium, dichlorotris(tri-o-tolylphosphine)ruthenium, dichlorotris(dichloroethylphosphine)ruthenium, dichlorotris(dichlorophenylphosphine)ruthenium, dichlorotris(trimethylphosphite)ruthenium, dichlorotris(triphenylphosphite)ruthenium and the like.

Examples of the metal component of the hydrogenation catalyst to be removed in the method for purifying a polymer of the present invention include transition metals such as palladium, platinum, nickel, rhodium, ruthenium. Preferably used are ruthenium, palladium and rhodium.

As a solvent used for the hydrogenation reaction, a solvent used for the polymerization reaction may be used as it is or a different solvent may be used. Furthermore, the amount of the hydrogenation catalyst using unsaturated bonds of the cyclic olefin polymer for hydrogenation is from 5 to 5,000 ppm, and preferably from 10 to 2,000 ppm, based on the weight of the cyclic olefin polymer as the amount of the metal component of the heterogeneous or homogeneous catalyst. The concentration of the polymer of the hydrogenation reaction is different depending on the kind of the cyclic olefin polymer, the hydrogenation catalyst and the solvent, but the concentration of the cyclic olefin polymer is usually in the range of 0.001 to 3 kg/kg, preferably in the range of 0.01 to 2 kg/kg and further preferably in the range of 0.02 to 1 kg/kg, based on 1 kg of the solvent.

The hydrogenation reaction of the cyclic olefin polymer is conducted under a hydrogen pressure of usually in the range of a normal pressure to 30 MPa, preferably in the range of 0.5 to 20 MPa, and particularly preferably in the range of 2 to 15

MPa. The reaction temperature is usually in the range of 0 to 300 degrees centigrade, preferably in the range of room temperature to 250 degrees centigrade, and particularly preferably in the range of 50 to 200 degrees centigrade. The reaction time is usually from 1 minute to 50 hours, preferably from 10 minutes to 30 hours and further preferably from 30 minutes to 20 hours.

A hydrogenated product can be obtained by the addition of hydrogen at a ratio of preferably from 50% to 100%, more preferably from 80% to 100% and further preferably from 90% to 100% in the presence of a hydrogenation catalyst to the unsaturated bonds of the cyclic olefin polymer.

The cyclic olefin polymer containing the structural unit [C] in which at least one of $R^{13}$ to $R^{16}$ of the general formula (3) is represented by carboxylic acid or hydroxycarbonylalkyl having 2 to 20 carbon atoms may be produced by any of a method involving polymerizing a cyclic olefin monomer corresponding to the structural unit [C] in which at least one of $R^{13}$ to $R^{16}$ is represented by carboxylic acid or hydroxycarbonylalkyl having 2 to 20 carbon atoms, and further adding hydrogen to the unsaturated bonds in the main chain to give saturated bonds, or a method involving subjecting at least one of esters of some of $R^1$ to $R^4$ in the structural unit [A] among the structural units [A] represented by the general formula (1) to hydrolysis with an acid or an alkali, acid elimination or pyrolysis to give a cyclic olefin polymer containing the structural unit [C] in which at least one of $R^{13}$ to $R^{16}$ of the general formula (3) is represented by carboxylic acid or hydroxycarbonylalkyl having 2 to 20 carbon atoms.

Furthermore, the method involving polymerizing a cyclic olefin monomer corresponding to the structural unit [C] represented by the general formula (3) and further subjecting it to hydrogenation may be carried out in the same reaction for polymerizing the cyclic olefin monomers corresponding to the structural unit [A] represented by the general formula (1) and the structural unit [B] represented by the general formula (2), and further subjecting it to hydrogenation.

Furthermore, the method involving subjecting at least one of esters of some of $R^1$ to $R^4$ in the structural unit [A] represented by the general formula (1) to hydrolysis with an acid or an alkali, or acid elimination to give a cyclic olefin polymer in which at least one of $R^{13}$ to $R^{16}$ of the structural unit [C] represented by the general formula (3) is carboxylic acid or hydroxycarbonylalkyl having 2 to 20 carbon atoms may be carried out by any of hydrolysis in the presence of an acid catalyst such as sulfuric acid, hydrochloric acid, nitric acid, toluenesulfonic acid, trifluoroacetic acid, acetic acid and water, acid elimination, or alkaline hydrolysis in the presence of an alkaline catalyst such as sodium hydroxide, potassium hydroxide, barium hydroxide and water. Or, as a method of eliminating an alkoxy group by decomposing ester with heat, decomposition may be carried out only by heating without the addition of an acid or an alkali.

The reaction temperature for subjecting at least one of esters of $R^1$ to $R^4$ in the structural unit [A] represented by the general formula (1) to hydrolysis with an acid or an alkali, acid elimination, or pyrolysis is usually in the range of 0 to 300 degrees centigrade and preferably in the range of room temperature to 250 degrees centigrade. Hydrolysis with an acid or an alkali, an acid elimination reaction, or an elimination reaction with heat of ester may be carried out in any stage of after the polymerization reaction, after the hydrogenation reaction, or after removal of the residual metal component of a polymerization catalyst and a hydrogenation catalyst.

Purification of Cyclic Olefin Polymer

The purification method of the present invention involves a step of bringing a solution containing the aforementioned cyclic olefin polymer and the metal component derived from a catalyst into contact with the organic compound containing a basic functional group and an acidic functional group to form an aggregate consisting of the metal component and the basic functional group of the organic compound by coordination or charge transfer interaction (first step), and a step of bringing the aggregate into contact with the basic adsorbent by bringing the solution into contact with a basic adsorbent, adsorbing the acidic functional group derived from the organic compound of the aggregate and the basic adsorbent by physical interaction such as ionic bonds, hydrogen bonds to remove the metal component in the aggregate (second step). Through these two steps, the metal component of the production catalyst can be removed from the cyclic olefin polymer containing a hetero atom and having high polarity.

Herein, in the solution containing the aforementioned cyclic olefin polymer and the metal component, the cyclic olefin polymer and the metal component may be dissolved therein, or the cyclic olefin polymer and the metal component may not be dissolved therein.

The basic functional group of the aforementioned organic compound containing a basic functional group and an acidic functional group is a functional group donating an electron pair, that is, an electron-pair donor, and the organic compound contains a basic functional group having any of a π electron, an unshared electron pair or an anion.

As the basic functional group, preferred is a functional group containing conjugated double bond carbon, nitrogen, oxygen, phosphorus and/or sulfur atom having at least a π electron. Examples thereof include condensed nitrogen-containing heterocyclic functional groups such as a phenyl group, a cyclopentadienyl group, an amino group, pyridine, phenanthroline; phosphorus-containing functional groups such as an ether group, a cyano group, a hydroxyl group, an ester group, a carbonyl group, phosphine, phosphate and the like; and functional groups such as a thioether group, a thiol group, a sulfonyl group. Particularly preferably used are condensed nitrogen-containing heterocyclic functional groups such as pyridine, phenanthroline and the like from the viewpoint of strength of the aggregation force with the metal component.

Furthermore, the acidic functional group of the organic compound is a functional group donating proton, that is, a proton donor, and is a functional group containing any of a phenolic hydroxyl group, phosphoric acid, boric acid, carboxylic acid, sulfonic acid (a phosphoric acid group, a boric acid group, a carboxyl group, a sulfo group) and the like. It may be a functional group requiring adsorption ability by physical interaction such as ionic bonds, hydrogen bonds with the basic adsorbent, and particularly preferably used are carboxylic acid and sulfonic acid from the viewpoint of the adsorption force.

Specific examples of the organic compound containing a basic functional group and an acidic functional group include 2-cyclopentadienylethyltrimethylammonium chloride, 2-methoxyethylcyclopentadiene, 2-dimethylaminoethylcyclopentadiene, N,N-dimethyl-N'-2-cyclopentadienylethylhydrazine, 2-cyclopentadienylethanecarboxylmide, 3-(2-cyclopentadienylethyl)pyridine, 5-(2-cyclopentadienylethyl)1,10-phenanthroline, 2-cyclopentadienylethyldimethylphosphine, 2-cyclopentadienylethyltrimethylphosphonium chloride, 2-cyclopentadienylethyldimethyl phosphate, p-(2-cyclopentadienylethyl)hydroxybenzene, 2-cyclopentadienylethanephosphoric acid, 2-cyclopentadienylethaneboric acid, 2-cyclopentadienylethyldimethylborane, 3-cyclopentadienylpropionic acid, 3-cyclopentadienylethylpropionic anhydride, 2-cyclopentadienylethyl mercaptan, 2-cyclopentadienylethanesulfonic acid, 2-aminoethyltrimethylammonium chloride, 2-aminoethylmethyl ether, diethylenetriamine, triethylenetetramine, hexamethylenediamine, N,N-dimethyl-N'-(2-aminoethyl)hydrazine, 2-aminoethanecarboxylmide, 4-dimethylaminopyridine, 5-amino-1,10-phenanthroline, 2-aminoethyldimethylphosphine, 2-aminoethyltrimethylphosphonium chloride, 2-aminoethyldimethyl phosphate, o-aminophenol, m-aminophenol, p-aminophenol, 2-aminoethanephosphoric acid, 2-aminoethaneboric acid, 2-aminoethyldimethylborane, alanine, 2-aminoethyl mercaptan, 2-aminoethanesulfonic acid, 4-methoxypyridine, 2-hydrazinopyridine, 3-pyridinecarboxylmide, bipyridine, 5-(4-pyridine)-1,10-phenanthroline, 2-(4-pyridyl)ethyldimethylphosphine, 2-(2-pyridine)ethyldimethyl phosphate, 3-hydroxypyridine, 2-(2-pyridine)ethylphosphoric acid, 4-pyridyldimethylborane, nicotinic acid, isonicotinic acid, picolinic acid, 2,4-pyridinedicarboxylic acid, 2,5-pyridinedicarboxylic acid, 3,4-pyridinedicarboxylic acid, 3,5-pyridinedicarboxylic acid, 2,6-pyridinedicarboxylic acid, 2,3-pyridinedicarboxylic acid, 2,2'-bipyridine-4,4'-dicarboxylic acid, nicotinic anhydride, 4-mercaptopyridine, 3-pyridinesulfonic acid, 2-(2-pyridine)ethanesulfonic acid, 2-(4-pyridine)ethanesulfonic acid, 5-methoxy-1,10-phenanthroline, 5-hydrazino-1,10-phenanthroline, 5-(1,10-phenanthroline)carboxylmide, 5-dimethylphosphino-1,10-phenanthroline, 5-hydroxy-1,10-phenanthroline, 5-(1,10-phenanthroline)phosphoric acid, 5-(1,10-phenanthroline)borane, 5-carboxy-1,10-phenanthroline, 5-carboxy-1,10-phenanthroline anhydride, 5-mercapto-1,10-phenanthroline, 5-(1,10-phenanthroline)sulfonic acid, 2-methoxyethyltrimethylammonium chloride, 1,4-dimethoxybutane, 2-methoxyethylhydrazine, 2-methoxyethylcarboxylmide, 2-methoxyethyldimethylphosphine, 2-methoxyethyltrimethylphosphonium chloride, 2-methoxyethyldimethyl phosphate, p-methoxyphenol, 2-methoxyethanephosphoric acid, 2-methoxyethaneboric acid, 2-methoxyethylborane, 3-methoxypropionic acid, 3-methoxypropionic anhydride, 2-methoxyethyl mercaptan, 2-methoxyethanesulfonic acid, 2-cyanoethyltrimethylammonium chloride, 2-methoxypropionitrile, 2-aminopropionitrile, 2-hydrazinoethylpropionitrile, 2-cyanoethylcarboxylmide, 3-cyanopyridine, 5-cyano-1,10-phenanthroline, 2-cyanoethyldimethylphosphine, 2-cyanoethyltrimethylphosphonium chloride, 2-cyanoethyldimethyl phosphate, p-cyanophenol, 2-cyanoethanephosphoric acid, 2-cyanoethaneboric acid, 2-cyanoethylborane, 3-cyanopropionic acid, 3-cyanopropionic anhydride, 2-cyanoethyl mercaptan, 2-cyanoethanesulfonic acid, 2-hydroxyethyltrimethylammonium chloride, ethylene glycol monomethyl ether, ethanolamine, 2-hydroxyethylhydrazine, 2-hydroxyethylcarbodiimide, 3-hydroxypyridine, 5-hydroxy-1,10-phenanthroline, 2-hydroxyethyldimethylphosphine, 2-hydroxyethyltrimethylphosphonium chloride, 2-hydroxyethyldimethyl phosphate, 2-hydroxyethanephosphoric acid, 2-hydroxyethaneboric acid, 2-hydroxyethylborane, hydroxyacetic acid, 2-hydroxyethyl mercaptan, 2-hydroxyethanesulfonic acid, 2-ethoxycarbonylethyltrimethylammonium chloride, ethyl 3-methoxypropionate, ethyl 3-aminopropionate, ethyl 3-hydrazinopropionate, 2-ethoxycarbonylethylcarboxylmide, ethyl 3-pyridinecarboxylate, 5-ethoxycarbonyl-1,10-phenanthroline, ethyl 3-dimethylphosphinopropionate, 2-ethoxycarbonylethyltrimethylphosphonium chloride, 2-ethoxycarbonyldimethyl phosphate, ethyl p-hydroxybenzoate, 2-ethoxycarbonylethanephosphoric acid, 2-ethoxycarbonylethaneboric acid, 2-ethoxycarbonylethylborane, ethyl 3-mercaptopropionate, 2-ethoxycarbonylethanesulfonic acid, 2-methylcarbonylethyltrimethylammonium chloride, 1-methoxy-3-butanone, 1-amino-3-butanone, 1-hydrazino-3-butanone, 2-acetylethylcarboxylmide, 3-acetylpyridine, 5-acetyl-1,10-phenanthroline, 1-dimethylphosphino-3-butanone, 2-acetylethyltrimethylphosphonium chloride, 2-acetylethyldimethyl phosphate, p-acetylphenol, 2-acetylethanephosphoric acid, 2-acetylethaneboric acid, 2-acetylethylborane, 3-acetylpropionic acid, 3-acetylpropionic anhydride, 1-mercapto-3-butanone, 2-acetylethanesulfonic acid, 2-carboxyethyltrimethylammonium chloride, 3-hydrazinopropionic acid, 2-carboxyethylcarbimide, 3-dimethylphosphinopropionic acid, 2-carboxyethyltrimethylphosphonium chloride, 2-carboxyethyldimethyl phosphate, p-hydroxybenzoic acid, 2-carboxyethanephosphoric acid, 2-carboxyethaneboric acid, 2-carboxyethylborane, succinic acid, 3-mercaptopropionic acid, 2-carboxyethanesulfonic acid, 2-dimethylphosphinoethyltrimethylammonium chloride, 2-hydrazinodimethylphosphine, 2-dimethylphosphinoethylcarboxylmide, 1,3-bisdimethylphosphinopropane, 2-dimethylphosphinoethyldimethyl phosphate, p-dimethylphosphinohydroxybenzene, 2-dimethylphosphinoethanephosphoric acid, 2-dimethylphosphinoethaneboric acid, 2-dimethylphosphinoborane, 3-dimethylphosphinopropionic anhydride, 2-mercaptoethyldimethylphosphine, 2-dimethylphosphinoethanesulfonic acid, p-hydroxyphenyl dimethyl phosphate, 2-mercaptoethyltrimethylammonium chloride, 2-hydrazinoethyl mercaptan, 2-mercaptoethylcarboxylmide, 2-mercaptoethyltrimethylphosphonium chloride, p-hydroxythiophenol, 2-mercaptoethanephosphoric acid, 2-mercaptoethylboric acid, 2-mercaptoethylborane, 3-mercaptopropionic anhydride, hexamethylenedithiol, 2-mercaptoethanesulfonic acid, 2-methylthioethyl-2-trimethylammonium chloride, 2-methoxyethyl methyl sulfide, 2-aminoethyl methyl sulfide, 2-methylthioethylhydrazine, 2-methylthioethylcarboxylmide, 3-methylthiopyridine, 5-methylthio-1,10-phenanthroline, 2-methylthioethyldimethylphosphine, 2-methylthioethyltrimethylphosphonium chloride, 2-methylthioethyldimethyl phosphate, 3-hydroxyphenyl methyl sulfide, 2-methylthioethanephosphoric acid, 2-methylthioethaneboric acid, 2-methylthioethylborane, 3-methylthiopropionic acid, 3-methylthiopropionic anhydride, 2-methylthioethyl mercaptan, 3-hydroxybenzenesulfonic acid, 2-sulfonylethylcarboxylmide and the like.

Among the organic compounds containing a basic functional group and an acidic functional group, preferably used are an aromatic carboxylic acid, sulfonic acid, phosphoric acid and boric acid and phenol, having a nitrogen atom. Specific examples include o-aminophenol, m-aminophenol, p-aminophenol, 2-aminoethanephosphoric acid, 2-aminoethaneboric acid, 2-aminoethanesulfonic acid, 2-(2-pyridine)ethylphosphoric acid, nicotinic acid, isonicotinic acid, picolinic acid, 2,4-pyridinedicarboxylic acid, 2,5-pyridinedicarboxylic acid, 3,4-pyridinedicarboxylic acid, 3,5-pyridinedicarboxylic acid, 2,6-pyridinedicarboxylic acid, 2,3-pyridinedicarboxylic acid, 2,2'-bipyridine-4,4'-dicarboxylic acid, 3-pyridinesulfonic acid, 2-(2-pyridine)ethanesulfonic acid, 2-(4-pyridine)ethanesulfonic acid and the like. Furthermore, the organic compounds may contain an electron attracting substituent such as fluorine, or an electron-donating substituent such as a t-butoxy group, a silyl group.

Particularly preferably used are aromatic carboxylic acids and sulfonic acid, having a nitrogen atom. Specific examples include nicotinic acid, isonicotinic acid, picolinic acid, 2,4-pyridinedicarboxylic acid, 2,5-pyridinedicarboxylic acid, 3,4-pyridinedicarboxylic acid, 3,5-pyridinedicarboxylic acid, 2,6-pyridinedicarboxylic acid, 2,3-pyridinedicarboxylic acid, 2,2'-bipyridine-4,4'-dicarboxylic acid, 3-pyridinesulfonic acid and the like.

Among these, from the viewpoint of removal of the metal component, preferably used are nicotinic acid, isonicotinic acid, picolinic acid, 2,2'-bipyridine-4,4'-dicarboxylic acid and 3-pyridinesulfonic acid.

In the present invention, when the solution containing a cyclic olefin polymer is brought into contact with the organic compound containing a basic functional group and an acidic functional group, the organic compound containing a basic functional group and an acidic functional group may be uniformly dissolved in a solvent or may be dispersed in a solvent as a solid.

Furthermore, the organic compound containing a basic functional group and an acidic functional group may be added to the solution containing a cyclic olefin polymer as it is, may be added in the state that it is dispersed or dissolved in a solvent, or may be mixed with a solvent having high polarity such as alcohol such as methanol, ethanol, DMF or water in order to increase the solubility of the organic compound.

The concentration of the cyclic olefin polymer when the organic compound containing a basic functional group and an acidic functional group is brought into contact with the solution containing the cyclic olefin polymer is different depending on the kind of the cyclic olefin polymer and the solvent in use, but the concentration of the cyclic olefin polymer is usually in the range of 0.001 to 3 kg/kg, preferably in the range of 0.01 to 2 kg/kg and further preferably in the range of 0.02 to 1 kg/kg, based on 1 kg of the solvent. The amount of the organic compound containing a basic functional group and an acidic functional group used is from 1 to 10,000 equivalents and preferably from 10 to 1,000 equivalents based on 1 mole of the metal component to be contacted. The contact temperature is from $-30$ to 300 degrees centigrade and preferably from 25 to 200 degrees centigrade. Furthermore, the contact pressure is from atmospheric pressure to 10 MPa. The contact time is usually from 1 minute to 50 hours, preferably from 10 minutes to 20 hours and further preferably from 30 minutes to 10 hours.

In the method for purifying a polymer of the present invention, filtration may be carried out in order to remove an insoluble matter in any stage of before the contact of the solution containing a cyclic olefin polymer with the organic compound containing a basic functional group and an acidic functional group, after the contact of the solution with the organic compound, or after the contact of the solution with the basic adsorbent. Or, filtration may be carried out in multiple stages using a filter material having a different pore diameter.

The filter material in use is not particularly limited, but it may be selected from cellulose fiber, hydrocarbon polymer fiber and the like, depending on the kind of the insoluble component, performance of the filter material or the like.

As the filter material of the cellulose fiber, preferably used is paper filter, while as the filter material of the hydrocarbon polymer fiber, preferably used are polypropylene and Teflon. The filter material may be re-used by cleaning. The filtration method is not particularly limited, and examples include pressure filtration, filtration under reduced pressure and the like.

In case of pressure filtration, filtration is carried out by pressurizing to equal to or more than $1 \times 10^2$ Pa and preferably from $1 \times 10^3$ to $1 \times 10^6$ Pa. The pressurizing gas is not particularly limited, and nitrogen, air or the like may be used.

In case of filtration under reduced pressure, the pressure reduction degree is not particularly limited as long as it is less than atmospheric pressure. The pore diameter of the filter material is usually from 0.01 to 50 µm, preferably from 0.02 to 20 µm and further preferably from 0.05 to 10 µm.

In the present invention, at the second step, the aggregate consisting of the metal component and the organic compound containing a basic functional group or an acidic functional group is brought into contact with a basic adsorbent, and the basic adsorbent adsorbs the aggregate to remove the residual metal component from the polymer solution.

Examples of the basic functional group contained in the basic adsorbent include functional groups containing nitrogen and/or phosphorus, and preferably used is an amino group. The basic adsorbent is preferably not soluble in a solvent, and the basic adsorbent may be an inorganic compound or an organic compound.

The basic adsorbent has adsorption ability with respect to a compound having an acidic functional group.

Examples of the basic adsorbent used in the present invention include anion exchange resins and amphoteric ion exchange resins. Examples include a styrene ion exchange resin having $-N^+(CH_3)_3OH^-$, a styrene ion exchange resin having $-N(CH_3)_2(C_2H_4OH)OH^-$, a styrene ion exchange resin having $-NH(CH_2CH_2NH)_nH$ (n=1 to 10), a styrene ion exchange resin having $-N(CH_3)_2$, a styrene ion exchange resin having $-N(CH_2COONa)_2$, a styrene ion exchange resin having $-N(CH_2COOH)_2$, a styrene ion exchange resin having a pyridine ring, an acrylic ion exchange resin having $-N(CH_3)_2$, a styrene ion exchange resin having a thiourea residue, a styrene ion exchange resin having $-N(CH_3)CH_2[CH(OH)]_4CH_2OH$, a styrene ion exchange resin having $-P(=O)(OCH_2NH_2)_3$, a di-2-ethylhexyl phosphate-impregnated polystyrene ion exchange resin, an epoxy ion exchange resin having $-NH(CH_2CH_2NH)_nH$ (n=1 to 20) and the like. The compound having such a functional group may be grafted or copolymerized with a synthetic resin, and may be crosslinked to obtain a solid insoluble in a solvent, or the molecular weight of these synthetic resins may be increased so as not to be soluble in a solvent.

Among these adsorbents containing a basic functional group, preferably are ion exchange resins having an amino group such as a styrene ion exchange resin having $-NH(CH_2CH_2NH)_nH$ (n=1 to 10), a styrene ion exchange resin having $-N(CH_3)_2$, a styrene ion exchange resin having a pyridine ring.

The particle diameter of the basic adsorbent is from 10 to 5,000 µm and preferably from 100 to 3,000 µm, while the amount of the basic adsorbent used is from 0.01 to 1 and preferably from 0.05 to 0.5 as the volume ratio when the volume of the cyclic olefin polymer solution is 1. The basic adsorbent may be cleaned with a solvent to remove impurities eluted from the adsorbent, and the solvent used for cleaning may be a solvent used for synthesis of the aforementioned cyclic olefin polymer, or a solvent such as alcohol such as methanol or ethanol, water. A method for cleaning a basic adsorbent is not particularly limited, and the basic adsorbent may be cleaned, for example, by putting the basic adsorbent into the tower and allowing a cleaning solvent to pass through, or may be cleaned by filtration or decantation by putting the basic adsorbent and the cleaning solvent into a vessel and mixing them.

Furthermore, for the purpose of removing the basic component eluted from the basic adsorbent, an acidic adsorbent may be used together. The acidic adsorbent may be preferably insoluble in a solvent, in order to remove the basic component by adsorption, and it may be an inorganic compound or an organic compound.

As the acidic functional group contained in the acidic adsorbent, there may be exemplified compounds containing a sulfo group, a carboxyl group or a hydroxyl group. Examples include a styrene ion exchange resin having —SO₃H, a styrene ion exchange resin having —COOH, an acrylic ion exchange resin having —COOH, a methacrylic ion exchange resin having —COOH, a phenolic ion exchange resin and the like. The compound having such a functional group may be grafted or copolymerized with a synthetic resin, and may be crosslinked to obtain a solid insoluble in a solvent, or the molecular weight of these synthetic resins may be increased so as not to be soluble in a solvent. Among these acidic adsorbents, preferably used is a styrene ion exchange resin having —SO₃H. The acidic adsorbent may be used by cleaning in the same manner as in the basic adsorbent.

The acidic adsorbent may be mixed with the basic adsorbent, or may be brought into contact with the basic adsorbent and then brought into contact with the solution. The amount of the acidic adsorbent used is from 0.01 to 1 and preferably from 0.1 to 0.5 as the volume ratio when the volume of the basic adsorbent is 1.

Meanwhile, in the second step of the present invention, a liquid phase of the solution containing the aggregate consisting of the metal component and the organic compound containing a basic functional group and an acidic functional group is brought into contact with a solid phase of the basic adsorbent. In this case, the basic adsorbent may be put into a packed tower and the aforementioned solution is allowed to pass though the packed tower, or the solution and the basic adsorbent may be contacted by mixing with stirring to separate the basic adsorbent by filtration or the like.

Figure 2:
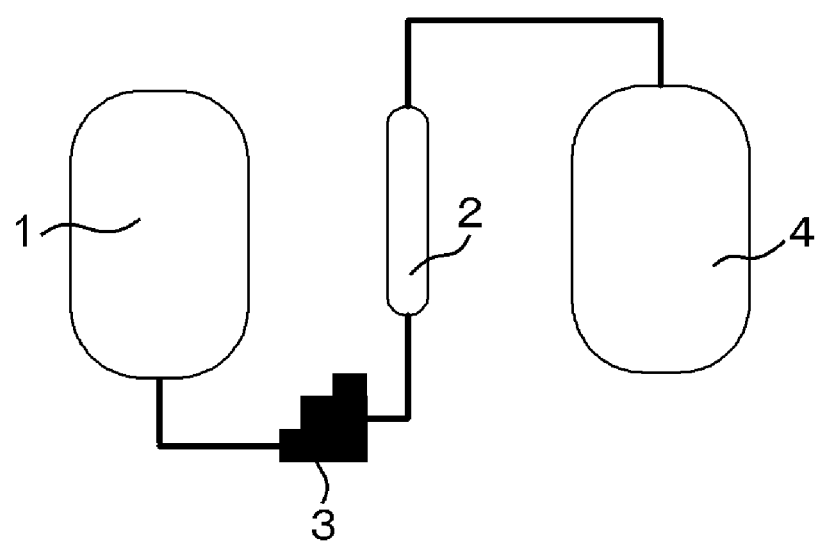
FIG. 2 is a schematic view illustrating a purifier.
Figure 3:
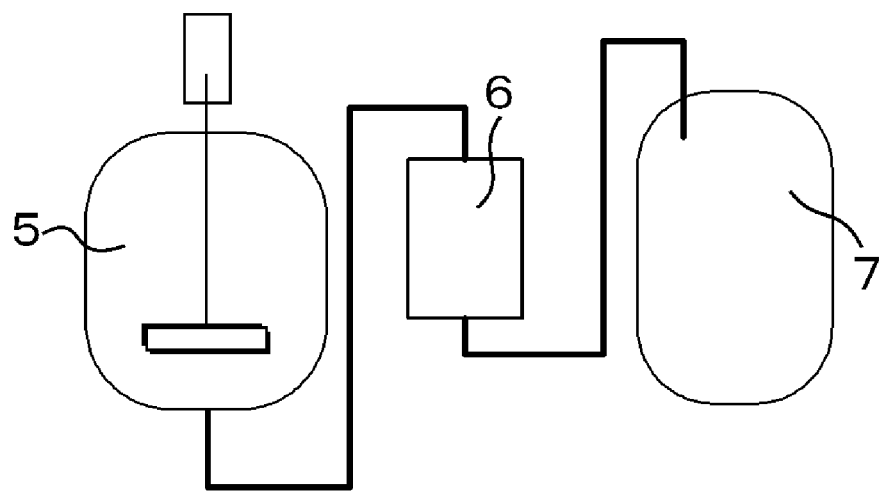
FIG. 3 is a schematic view illustrating a purifier.

Herein, the purification method of the present invention may be conducted by the use of the devices as shown in FIGS. 1 to 3. The method will be described in detail below.

As shown in FIG. 1, the solution containing the aforementioned cyclic olefin polymer and the metal component is mixed with the aforementioned organic compound containing a basic functional group and an acidic functional group in a vessel 1. Then, an aggregate consisting of the metal component and the aforementioned organic compound is formed.

Thereafter, the solution containing the aggregate is allowed to pass through a basic adsorbent-packed tower 2 and is returned to the vessel 1. Herein, the symbol 3 in FIG. 1 indicates a pump.

As shown in FIG. 2, in the same manner as in FIG. 1, the solution containing the aforementioned cyclic olefin polymer and the metal component is mixed with the aforementioned organic compound containing a basic functional group and an acidic functional group in a vessel 1. Thereafter, the solution containing an aggregate is allowed to pass through a basic adsorbent-packed tower 2 and then it is recovered at a liquid receiving vessel 4.

Incidentally, in FIGS. 1 and 2, the direction of the solution passing through to the packed tower 2 may be either from the top to the bottom of the packed tower 2, or from the bottom to the top. When the direction is from the bottom to the top, the basic adsorbent-packed tower 2 may be a fixed bed or a fluidized bed. To allow the solution containing the aggregate to pass through from the vessel 1 to the packed tower 2, the solution may be discharged from the bottom pipe of the vessel 1, or may be discharged from the top of the vessel 1 by putting a pipe in.

On the other hand, the device as shown in FIG. 3 may be used. The solution containing the aforementioned cyclic olefin polymer and the metal component is mixed with the aforementioned organic compound containing a basic functional group and an acidic functional group in a vessel 5. Then, an aggregate consisting of the metal component and the aforementioned organic compound is formed.

Thereafter, a basic adsorbent is put into the vessel 5 for mixing with stirring. Thereafter, the mixture in the vessel 5 passes through a filter 6 to filter the basic adsorbent, and the filtered solution is introduced into a liquid receiving vessel 7.

The concentration of the cyclic olefin polymer when the aggregate is brought into contact with the basic adsorbent is different depending on the kind of the cyclic olefin polymer and the solvent in use, but the concentration of the cyclic olefin polymer is usually in the range of 0.001 to 3 kg/kg, preferably in the range of 0.01 to 2 kg/kg and further preferably in the range of 0.02 to 1 kg/kg, based on 1 kg of the solvent.

The temperature for contact of the aggregate with the basic adsorbent is from −30 to 150 degrees centigrade and preferably from 0 to 60 degrees centigrade. Furthermore, the contact pressure is from atmospheric pressure to 1 MPa. The contact speed when they are contacted by passing through the packed tower is usually from 1 to 500 (m/hour) and preferably from 10 to 300 (m/hour) in terms of the linear flow velocity LV. Meanwhile, the liquid (space) flow velocity SV is from 1 to 1,000 (1/hour) and preferably from 10 to 500 (1/hour). The length, thickness, volume and shape of the packed tower are dependent on the size of processing amount, flowing time and economic efficiency, but they may be in the range satisfying the linear flow velocity and the liquid flow velocity.

Meanwhile, the contact time for contact by mixing is usually from 30 minutes to 48 hours, preferably from 1 to 24 hours and further preferably from 1 to 12 hours. Mixing may be carried out with any of a stirring blade, rotation, shaking, ultrasonic waves and the like. The method for purifying a polymer of the present invention consisting of the aforementioned former step and the later step may be repeatedly carried out multiple times as necessary.

In the present invention, it is possible to produce a cyclic olefin polymer having the content of all residual metal components of equal to or less than 1,000 ppb in accordance with the aforementioned purification method in which the metal component (residual metal component) derived from a production catalyst is removed from the cyclic olefin polymer containing a hetero atom and having high polarity. In the cyclic olefin polymer, the content of all residual metal components is usually equal to or less than 1,000 ppb, preferably equal to or less than 800 ppb and further preferably equal to or less than 500 ppb. When the content exceeds 1,000 ppb, the residual metal is reacted with a stabilizer or the like through a product manufacturing process, so that optical properties might possibly be deteriorated, and electrical and electronic properties might possibly be adversely affected due to the change of color such as yellow or the like; or metals might possibly be contaminated in a semiconductor manufacturing process, and product quality of the semiconductor itself might possibly be adversely affected.

Incidentally, the lower limit of the residual metal component is not particularly limited, but it is usually equal to or more than 10 ppb.

Also, as necessary, an anti-oxidant, a surfactant, a modifier such as a plasticizer, a UV absorber, a stabilizer such as an antibacterial agent, a glass fiber, or a reinforcing agent such as inorganic filler may be added.

The cyclic olefin polymer obtained by the method of purifying a cyclic olefin of the present invention has the content of all residual metal components of equal to or less than 1,000 ppb. The cyclic olefin polymer can be used for the application to optical components requiring high transparency without discoloration (yellowing), and the application to semiconductor materials or electronic materials of an organic EL, a liquid crystal plastic substrate or a resist composition.

EXAMPLES

The present invention is now illustrated in detail below with reference to Examples. However, the present invention is not restricted to these Examples.

Incidentally, the analysis values of the polymers obtained in Examples and Synthesis Examples were measured in the following manner.

Measurement of Weight Average Molecular Weight 10 mg of a polymer sample was dissolved in 2 g of tetrahydrofuran, and the molecular weight was calibrated at 40 degrees centigrade at a flow rate of 1.0 ml/min by a standard polystyrene conversion method using gel permeation chromatography (GPC), 830-RI and UVIDEC-100-VI manufactured by JASCO Corporation as a detector, and Shodex k-805, 804, 803 and 802.5 as columns connected in series.

Measurement of Hydrogenation Rate

A polymer sample was dissolved in deuterated chloroform, and an integral value of a peak assigned to hydrogen carbon double bonds in the range of a chemical shift of $\delta=4.0$ to $6.5$ ppm was calculated by using a 270 MHz $^1$H-NMR spectrum.

Measurement of Metal Content

A powder of a polymer sample was accurately weighed in a vessel and subjected to pyrolysis along with nitric acid using a microwave, and the residual metal component was quantitatively analyzed using an ICP-MS apparatus (HP-4500) manufactured by Agilent Technologies, Inc. Or, a polymer sample of a solution was accurately weighed in a vessel, heated to evaporate a solvent, and then subjected to pyrolysis along with nitric acid using a microwave, and the residual metal component was quantitatively analyzed by the ICP-MS method.

Measurement of Composition of Structural Unit

A polymer sample was dissolved in deuterated tetrahydrofuran, and the molar ratios of respective structural units [A], [B] and [C] were measured by an integral value of a peak assigned to each carbonyl at a chemical shift of $\delta=170$ to $190$ ppm using a 400 MHz $^{13}$C-NMR spectrum.

Synthesis Example 1

In 5 L autoclave equipped with a magnetic stirring device, 304 g (2 mol) of 4,10-dioxa-tricyclo[5.2.1.0$^{2,6}$]deca-8-ene-3-one, 601 g (2 mol) of 8-(1-ethylcyclopentyloxycarbonyl)tetracyclo[4.4.0.1$^{2,5}$.1$^{7,10}$]-3-dodecene and 21 g (0.25 mol) of 1,5-hexadiene were dissolved in 3.2 kg of tetrahydrofuran (hereinafter referred to as THF) and stirred under a nitrogen atmosphere. Then, 310 mg (0.4 mmol) of Mo(N-2,6-Pr$^i_2$C$_6$H$_3$)(CHCMe$_2$Ph)(OCMe(CF$_3$)$_2$)$_2$ as a ring-opening metathesis polymerization catalyst was added thereto, and the mixture was reacted at 60 degrees centigrade for 3 hours. Thereafter, 90 mg (1.2 mmol) of n-butylaldehyde was added and the reaction mixture was cooled to obtain 4.1 kg of a ring-opening metathesis polymer solution.

33 g of 5% ruthenium alumina as a hydrogenation catalyst was added to 3.0 kg of the ring-opening metathesis polymer solution obtained in the 5 L autoclave to carry out a hydrogenation reaction under a hydrogen pressure of 8 MPa at 160 degrees centigrade for 5 hours, and then the temperature was returned to room temperature to discharge hydrogen gas. The resulting solution was filtered through a filter having a pore diameter of 1 µm to obtain 3.0 kg of a hydrogenated ring-opening metathesis polymer solution.

10 g of the resulting hydrogenated ring-opening metathesis polymer solution was added to 200 ml of pure water to precipitate a hydrogenated ring-opening metathesis polymer which was separated by filtration and then subjected to vacuum drying to obtain 2.1 g of a hydrogenated ring-opening metathesis polymer in the form of a white powder. The hydrogenation rate calculated from $^1$H-NMR of the resulting hydrogenated ring-opening metathesis polymer was 100% and the weight average molecular weight measured by GPC was 15,000. Furthermore, the molar ratio of the structural units [A]/[B] in the resulting polymer was 50/50 according to $^{13}$C-NMR analysis.

The content of molybdenum metal in the resulting hydrogenated ring-opening metathesis polymer solution was 2.49 ppm and the content of ruthenium metal was 3.76 ppm. The concentration of the polymer solution was 20.9 wt %, the content of molybdenum metal in the polymer was 12 ppm, and the content of ruthenium metal was 18 ppm.

Synthesis Example 2

In 1 m$^3$ reactor equipped with a magnetic stirring device, 55 kg (360 mol) of 4,10-dioxa-tricyclo[5.2.1.0$^{2,6}$]deca-8-ene-3-one, 108 kg (360 mol) of 8-(1-ethylcyclopentyloxycarbonyl)tetracyclo[4.4.0.1$^{2,5}$.1$^{7,10}$]-3-dodecene and 5 kg (61 mol) of 1,5-hexadiene were dissolved in 580 kg of THF under a nitrogen atmosphere. 110 g (144 mmol) of Mo(N-2,6-Pr$^i_2$C$_6$H$_3$)(CHCMe$_2$Ph)(OCMe (CF$_3$)$_2$)$_2$ was added thereto, and the mixture was reacted in the same manner as in Synthesis Example 1 to obtain 740 kg of a ring-opening metathesis polymer solution.

Next, in the 1 m$^3$ autoclave, 47.9 g (50.0 mmol) of dichlorotris(triphenylphosphine)ruthenium and 5.1 g (50 mmol) of triethylamine were added to 720 kg of the above solution to carry out a hydrogenation reaction under a hydrogen pressure of 9 MPa at 120 degrees centigrade for 15 hours. After cooling, hydrogen was discharged, whereby 724 kg of a hydrogenated ring-opening metathesis polymer solution was obtained.

10 g of the resulting hydrogenated ring-opening metathesis polymer solution was added in the same manner as in Synthesis Example 1 to obtain 2.1 g of a hydrogenated ring-opening metathesis polymer. The hydrogenation rate was 100% and the weight average molecular weight was 12,000. Furthermore, the molar ratio of the structural units [A]/[B] in the resulting polymer was 50/50. The content of molybdenum metal in the hydrogenated polymer solution was 16.4 ppm and the content of ruthenium metal was 6.5 ppm. The concentration of the polymer solution was 21.0 wt %, the content of molybdenum metal in the polymer was 78 ppm, and the content of ruthenium metal was 31 ppm.

Synthesis Example 3

In 5 L autoclave equipped with a magnetic stirring device, 48 g (0.32 mol) of 4,10-dioxa-tricyclo[5.2.1.0$^{2,6}$]deca-8-ene-3-one, 853 g (2.84 mol) of 8-(1-ethylcyclopentyloxycarbonyl)tetracyclo[4.4.0.1$^{2,5}$.1$^{7,10}$]-3-dodecene and 6 g (65 mmol) of 1,6-heptadiene were dissolved in 3.2 kg of THF under a nitrogen atmosphere. 320 mg (0.39 mmol) of Mo(N-2,6-Me$_2$C$_6$H$_3$)(CHCMe$_2$Ph)(OC(CF$_3$)$_3$)$_2$ was added thereto, and the mixture was reacted in the same manner as in Synthesis Example 1 to obtain 4.1 kg of a ring-opening metathesis polymer solution.

In the 5 L autoclave, 3.0 kg of the ring-opening metathesis polymer solution, 210 mg (0.3 mmol) of dichlorotris(triphenylphosphine)ruthenium and 12.8 mg (0.1 mmol) of triethylamine were added to carry out a hydrogenation reaction under a hydrogen pressure of 9 MPa at 120 degrees centigrade for 6 hours. After cooling, hydrogen was discharged in the same manner as in Synthesis Example 1, whereby 3.1 kg of a hydrogenated ring-opening metathesis polymer solution was obtained.

10 g of the resulting hydrogenated ring-opening metathesis polymer solution was added in the same manner as in Synthesis Example 1 to obtain 2.1 g of a hydrogenated ring-opening metathesis polymer. The hydrogenation rate was 100% and the weight average molecular weight was 17,000. Furthermore, the molar ratio of the structural units [A]/[B] in the resulting polymer was 90/10. The content of molybdenum metal in the hydrogenated polymer solution was 8.40 ppm and the content of ruthenium metal was 6.72 ppm. The concentration of the polymer solution was 21.0 wt %, the content of molybdenum metal in the polymer was 40 ppm, and the content of ruthenium metal was 32 ppm.

Synthesis Example 4

456 g (3 mol) of 4,10-dioxa-tricyclo[5.2.1.0$^{2,6}$]deca-8-ene-3-one and 300 g (1 mol) of 8-(1-ethylcyclopentyloxycarbonyl)tetracyclo[4.4.0.1$^{2,5}$.1$^{7,10}$]-3-dodecene as cyclic olefin monomers and 36.5 g (0.44 mol) of 1,5-hexadiene were dissolved in 3.0 kg of THF. 410 mg (0.5 mmol) of Mo(N-2,6-Me$_2$C$_6$H$_3$)(CHCMe$_2$Ph)(OC(CF$_3$)$_3$)$_2$ was added thereto, and the mixture was reacted in the same manner as in Synthesis Example 3 to obtain 3.8 kg of a ring-opening metathesis polymer solution.

3.0 kg of the ring-opening metathesis polymer solution and 50 g of 5% palladium carbon (Pd/C) were added in the same manner as in Synthesis Example 3, and a hydrogenation reaction was carried out in the same manner as in Synthesis Example 3 to obtain 2.9 kg of a hydrogenated ring-opening metathesis polymer solution.

10 g of The hydrogenated polymer solution was added in the same manner as in Synthesis Example 1 to obtain 1.9 g of a hydrogenated ring-opening metathesis polymer. The hydrogenation rate was 80% and the weight average molecular weight was 8,900. Furthermore, the molar ratio of the structural units [A]/[B] in the resulting polymer was 25/75. The content of molybdenum metal in the hydrogenated polymer solution was 8.80 ppm, the content of palladium metal was 11.5 ppm, the concentration of the polymer solution was 19.2 wt %, the content of molybdenum metal in the polymer was 46 ppm, and the content of palladium metal was 60 ppm.

Synthesis Example 5

304 g (2 mol) of 4,10-dioxa-tricyclo[5.2.1.0$^{2,6}$]deca-8-ene-3-one and 496 g (2 mol) of 8-methoxymethyloxycarbonyl-tetracyclo[4.4.0.1$^{2,5}$.1$^{7,10}$]-3-dodecene as cyclic olefin monomers and 115 g (1 mol) of 1-octene were dissolved in 3.2 kg of THF. 420 mg (0.5 mmol) of W(N-2,6-Pr$^i_2$C$_6$H$_3$)(CHCMe$_2$Ph)(OCMe(CF$_3$)$_2$)$_2$ was added thereto, and the mixture was reacted in the same manner as in Synthesis Example 3 to obtain 3.9 kg of a ring-opening metathesis polymer solution.

3.0 kg of the ring-opening metathesis polymer solution, 240 mg (0.26 mmol) of chlorotris(triphenylphosphine) rhodium and 26 mg (0.26 mmol) of triethylamine were added in the same manner as in Synthesis Example 3, and a hydrogenation reaction was carried out in the same manner as in Synthesis Example 3 to obtain 3.0 kg of a hydrogenated ring-opening metathesis polymer solution.

10 g of the resulting hydrogenated ring-opening metathesis polymer solution was added in the same manner as in Synthesis Example 1 to obtain 1.9 g of a hydrogenated ring-opening metathesis polymer. The hydrogenation rate was 100% and the weight average molecular weight was 8,000. Furthermore, the molar ratio of the structural units [A]/[B] in the resulting polymer was 50/50. Furthermore, the content of tungsten metal in the hydrogenated polymer solution was 20.8 ppm, the content of rhodium metal was 7.94 ppm, the concentration of the polymer solution was 18.9 wt %, the content of tungsten metal in the polymer was 110 ppm, and the content of rhodium metal was 42 ppm.

Synthesis Example 6

741 g (4 mol) of 8-cyano-tetracyclo[4.4.0.1$^{2,5}$.1$^{7,10}$]-3-dodecene as cyclic olefin monomer and 22 g (0.26 mol) of 1-hexene were dissolved in 3.0 kg of THF. 220 mg (0.4 mmol) of Mo(N-2,6-Pr$^i_2$C$_6$H$_3$)(CHCMe$_2$Ph)(OCMe$_3$)$_2$ was added thereto, and the mixture was reacted in the same manner as in Synthesis Example 3 to obtain 3.8 kg of a ring-opening metathesis polymer solution.

3.0 kg of the ring-opening metathesis polymer solution, 0.18 g (0.19 mmol) of chlorohydridocarbonyltris(triphenylphosphine)ruthenium and 20 mg (0.19 mmol) of triethylamine were added in the same manner as in Synthesis Example 3, and a hydrogenation reaction was carried out in the same manner as in Synthesis Example 3 to obtain 3.0 kg of a hydrogenated ring-opening metathesis polymer solution.

10 g of the resulting hydrogenated ring-opening metathesis polymer solution was added in the same manner as in Synthesis Example 1 to obtain 1.9 g of a hydrogenated ring-opening metathesis polymer. The hydrogenation rate was 100% and the weight average molecular weight was 19,000. Furthermore, the content of molybdenum metal in the hydrogenated polymer solution was 9.45 ppm, the content of ruthenium metal was 5.86 ppm, the concentration of the polymer solution was 18.9 wt %, the content of molybdenum metal in the polymer was 50 ppm, and the content of ruthenium metal was 31 ppm.

Synthesis Example 7

655 g (3 mol) of 8-methoxycarbonyltetracyclo[4.4.0.1$^{2,5}$.1$^{7,10}$]-3-dodecene as cyclic olefin monomer and 6.6 g (81 mmol) of 1,5-hexadiene were dissolved in 3.1 kg of THF. 230 mg (0.3 mmol) of Mo(N-2,6-Pr$^i_2$C$_6$H$_3$)(CHCMe$_2$Ph)(OCMe (CF$_3$)$_2$)$_2$ was added thereto, and the mixture was reacted in the same manner as in Synthesis Example 3 to obtain 3.8 kg of a ring-opening metathesis polymer solution.

3.0 kg of the ring-opening metathesis polymer solution, 0.2 g (0.21 mmol) of chlorohydridocarbonyltris(triphenylphosphine)ruthenium and 21 mg (0.2 mmol) of triethylamine were added in the same manner as in Synthesis Example 3, and a hydrogenation reaction was carried out in the same manner as in Synthesis Example 3 to obtain 3.0 kg of a hydrogenated ring-opening metathesis polymer solution.

10 g of the resulting hydrogenated ring-opening metathesis polymer solution was added in the same manner as in Synthesis Example 1 to obtain 2.1 g of a hydrogenated ring-opening metathesis polymer. The hydrogenation rate was 100% and the weight average molecular weight was 28,000. Furthermore, the content of molybdenum metal in the hydrogenated polymer solution was 6.75 ppm, the content of ruthenium metal was 6.33 ppm, the concentration of the polymer solution was 21.1 wt %, the content of molybdenum metal in the polymer was 32 ppm, and the content of ruthenium metal was 30 ppm.

Figure 4:
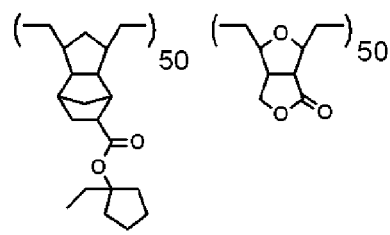
FIG. 4 is a view illustrating the structural units of the polymers obtained in Synthesis Examples 1 to 7.
Figure 4:
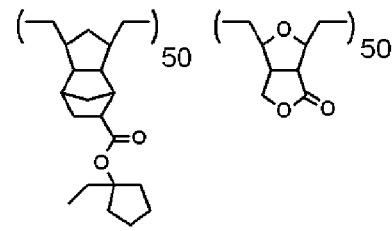
Figure 4:
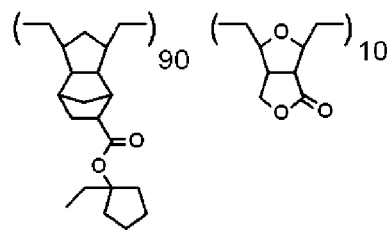
Figure 4:
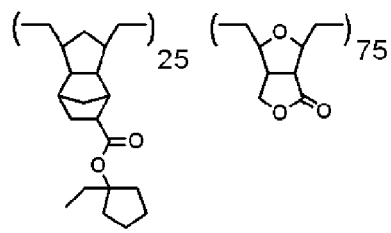
Figure 4:
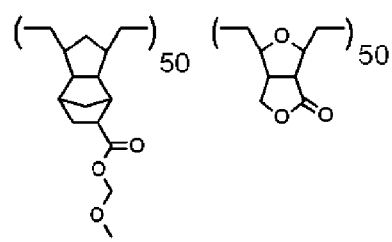
Figure 4:
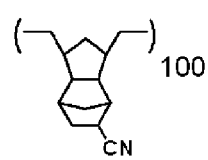
Figure 4:
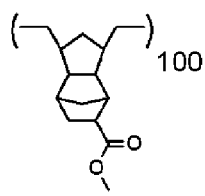

Structures of the repeating structural units of the polymers obtained in Synthesis Examples 1 to 7 are shown in FIG. 4.

In Synthesis Example 1, the molar ratio of the structural unit [A] to the structural unit [B] of 50:50 is shown. In other Synthesis Examples, it is shown in the same manner.

Example 1

1 kg of a THF solution of the hydrogenated ring-opening metathesis polymer obtained in Synthesis Example 1, 1.44 g (11.7 mmol) of isonicotinic acid and 27 g of water were added into 2 L autoclave, and the mixture was heated at 100 degrees centigrade for 6 hours with stirring under a nitrogen atmosphere and then cooled to room temperature.

This solution was pressure-filtered through a membrane filter made of Teflon having a pore diameter of 0.5 μm, and then 400 ml of a styrene ion exchange resin, DIAION CR20 (a product of Mitsubishi Chemical Corporation) containing polyamine (containing an amino group), was added thereto. The mixture was stirred at room temperature for 1 hour, and then the aforementioned ion exchange resin was separated by filtration.

10 g of the thus-obtained hydrogenated ring-opening metathesis polymer solution was added to 200 ml of pure water to precipitate a hydrogenated ring-opening metathesis polymer which was separated by filtration and then subjected to vacuum drying to obtain 1.80 g of a hydrogenated ring-opening metathesis polymer in the form of a white powder. The molar ratio of the structural units [A]/[B] in the resulting hydrogenated ring-opening metathesis polymer was 50/50 according to $^{13}$C-NMR analysis, the content of molybdenum metal in the polymer was 160 ppb, and the content of ruthenium metal was 240 ppb.

Example 2

In 2 L autoclave, isonicotinic acid and water were added to 1 kg of a THF solution of the hydrogenated ring-opening metathesis polymer obtained in Synthesis Example 2 in the same manner as in Example 1, and the mixture was heated at 100 degrees centigrade for 3 hours and then cooled to room temperature (first step). Next, 400 ml of DIAION CR20 was added to the cooled solution (second step). Furthermore, the first step and the second step were repeated again in this order.

10 g of the thus-obtained hydrogenated ring-opening metathesis polymer solution was precipitated in the same manner as in Example 1 to obtain 1.7 g of a hydrogenated ring-opening metathesis polymer. The molar ratio of the structural units [A]/[B] in the resulting hydrogenated ring-opening metathesis polymer was 50/50, the content of molybdenum metal in the polymer was 100 ppb, and the content of ruthenium metal was 130 ppb.

Example 3

0.1 g (0.6 mmol) of 3-pyridinesulfonic acid and 27 g of water were added to 1 kg of the purified solution of Example 2 (solution obtained by repeatedly carrying out the first step and the second step two times), and the mixture was heated at 100 degrees centigrade for 3 hours with stirring under a nitrogen atmosphere and then cooled to room temperature.

This solution was filtered, 400 ml of DIAION CR20 was added thereto, and the mixture was filtered.

10 g of the thus-obtained hydrogenated ring-opening metathesis polymer solution was precipitated in the same manner as in Example 2 to obtain 1.7 g of a hydrogenated ring-opening metathesis polymer. The molar ratio of the structural units [A]/[B]/[C] in the resulting hydrogenated ring-opening metathesis polymer was 45/50/5, the content of molybdenum metal in the polymer was 40 ppb, and the content of ruthenium metal was 80 ppb.

In this Example, by the use of strongly acidic 3-pyridinesulfonic acid, some of esters in the structural unit [B] were subjected to acid elimination to generate the structural unit [C].

Example 4

2.7 g (11 mmol) of 2,2'-bipyridine-4,4'-dicarboxylic acid and 27 g of water were added to 1 kg of the purified solution of Example 2 (solution obtained by repeatedly carrying out the first step and the second step two times), and the mixture was heated at 110 degrees centigrade for 6 hours with stirring under a nitrogen atmosphere and then cooled to room temperature. This solution was filtered, 200 ml of DIAION CR20 was added thereto, and then the mixture was filtered.

10 g of the thus-obtained hydrogenated ring-opening metathesis polymer solution was precipitated in the same manner as in Example 2 to obtain 1.6 g of a hydrogenated ring-opening metathesis polymer. The molar ratio of the structural units [A]/[B] in the resulting hydrogenated ring-opening metathesis polymer was 50/50, the content of molybdenum metal in the polymer was 80 ppb, and the content of ruthenium metal was 100 ppb.

Example 5

1.2 g (9.8 mmol) of picolinic acid was added to 1 kg of the hydrogenated ring-opening metathesis polymer obtained in Synthesis Example 3, and the mixture was heated at 100 degrees centigrade for 6 hours with stirring under a nitrogen atmosphere and then cooled to room temperature (first step). This solution was filtered, and 400 ml of DIAION CR20 was added thereto (second step). Furthermore, the first step and the second step were repeated again in this order.

10 g of the thus-obtained hydrogenated ring-opening metathesis polymer solution was precipitated in the same manner as in Example 2 to obtain 1.6 g of a hydrogenated ring-opening metathesis polymer. The molar ratio of the structural units [A]/[B] in the resulting hydrogenated ring-opening metathesis polymer was 90/10, the content of molybdenum metal in the polymer was 110 ppb, and the content of ruthenium metal was 180 ppb.

Example 6

2.5 g (20 mmol) of isonicotinic acid and 27 g of water were added to 1 kg of the hydrogenated ring-opening metathesis polymer obtained in Synthesis Example 4, and the mixture was heated at 110 degrees centigrade for 6 hours with stirring under a nitrogen atmosphere and then cooled to room temperature (first step). This solution was filtered, 300 ml of DIAION CR20 (a basic adsorbent) was mixed with 100 ml of LEWATIT S100H (a styrene ion exchange resin, a product of Bayer AG) of an acidic adsorbent containing a sulfonic acid group, and the second step was carried out in the same manner as in Example 2. The first step and the second step were further repeatedly carried out two times.

10 g of the thus-obtained hydrogenated ring-opening metathesis polymer solution was precipitated in the same manner as in Example 2 to obtain 1.6 g of a hydrogenated ring-opening metathesis polymer. The molar ratio of the structural units [A]/[B] in the resulting hydrogenated ring-opening metathesis polymer was 25/75, the content of molybdenum metal in the polymer was 133 ppb, and the content of palladium metal was 53 ppb.

Example 7

1.5 g (12 mmol) of nicotinic acid and 27 g of water were added to 1 kg of the hydrogenated ring-opening metathesis polymer obtained in Synthesis Example 5, and the mixture was heated at 110 degrees centigrade for 6 hours with stirring under a nitrogen atmosphere and then cooled to room temperature (first step). This solution was filtered, 300 ml of DIAION CR20 was mixed with 100 ml of LEWATIT S100H in the same manner as in Example 6, and the second step was carried out. Furthermore, the first step and the second step were repeated again in this order.

10 g of the thus-obtained hydrogenated ring-opening metathesis polymer solution was precipitated in the same manner as in Example 6 to obtain 1.7 g of a hydrogenated ring-opening metathesis polymer. The molar ratio of the structural units [A]/[B] in the resulting hydrogenated ring-opening metathesis polymer was 50/50, the content of tungsten metal in the polymer was 115 ppb, and the content of rhodium metal was 160 ppb.

Example 8

An operation was carried out in the same manner as in Example 2, except that 1 kg of the hydrogenated ring-opening metathesis polymer obtained in Synthesis Example 6 was used instead of the hydrogenated ring-opening metathesis polymer obtained in Synthesis Example 2, 0.1 g (0.6 mmol) of 3-pyridinesulfonic acid was used instead of isonicotinic acid, and 300 ml of DIAION CR20 was used.

10 g of the thus-obtained hydrogenated ring-opening metathesis polymer solution was precipitated in the same manner as in Example 2 to obtain 1.6 g of a hydrogenated ring-opening metathesis polymer. The content of molybdenum metal in the polymer was 63 ppb and the content of ruthenium metal was 200 ppb.

Example 9

An operation was carried out in the same manner as in Example 2, except that 1 kg of the hydrogenated ring-opening metathesis polymer obtained in Synthesis Example 7 was used instead of the hydrogenated ring-opening metathesis polymer obtained in Synthesis Example 2, and 1.2 g (9.8 mmol) of isonicotinic acid and 300 ml of DIAION CR20 were used.

10 g of the thus-obtained hydrogenated ring-opening metathesis polymer solution was precipitated in the same manner as in Example 2 to obtain 1.7 g of a hydrogenated ring-opening metathesis polymer. The content of molybdenum metal in the polymer was 40 ppb and the content of ruthenium metal was 180 ppb.

Example 10

An operation was carried out in the same manner as in Example 2, except that DIAION CR20 used in Example 2 was replaced by 600 ml of DIAION WA20 (a basic adsorbent, a product of Mitsubishi Chemical Corporation), that is, a styrene ion exchange resin containing a $CH_2NH(CH_2CH_2NH)_n$ H group.

10 g of the thus-obtained hydrogenated ring-opening metathesis polymer solution was precipitated in the same manner as in Example 2 to obtain 1.61 g of a hydrogenated ring-opening metathesis polymer. The molar ratio of the structural units [A]/[B] in the resulting hydrogenated ring-opening metathesis polymer was 50/50, the content of molybdenum metal in the polymer was 136 ppb, and the content of ruthenium metal was 184 ppb.

Example 11

In 250 L reactor, 165 kg of a THF solution of the hydrogenated ring-opening metathesis polymer (polymer concentration 20.7 wt %) obtained in Synthesis Example 2, 243 g (2 mol) of isonicotinic acid and 4.7 kg of water were added, and the mixture was heated at 100 degrees centigrade for 6 hours with stirring under a nitrogen atmosphere and then cooled to room temperature (first step).

A tower having an internal diameter of 250 mm was filled with 25 L of DIAION CR20, and the reactor was connected to the bottom of the tower through a pump by piping from the bottom of the reactor to form a circulation pipeline for returning to the top of the reactor. While keeping the solution obtained in the first step at a temperature of 15 to 25 degrees centigrade, the solution was allowed to flow to the tower from the bottom of the reactor at a pump flow rate of 1 $m^3$/hour and a liquid flow velocity SV of 40 (1/hour), to continuously operate for 8 hours while returning to the reactor. The solution inside the tower and the pipeline was all returned to the reactor (second step). Furthermore, the first step and the second step were repeated again in this order.

The solution obtained after the second step was collected from the reactor and precipitated in the same manner as in Example 2 to analyze the residual metal of a hydrogenated ring-opening metathesis polymer in the form of a white powder and as a result, the content of molybdenum metal in the polymer was 118 ppb, and the content of ruthenium metal was 182 ppb.

Example 12

In 250 L reactor, 165 kg of a THF solution of the hydrogenated ring-opening metathesis polymer obtained in Synthesis Example 2, 243 g (2 mol) of isonicotinic acid and 4.7 kg of water were added, and the mixture was heated at 100 degrees centigrade for 6 hours with stirring under a nitrogen atmosphere and then cooled to room temperature (first step).

Towers having an internal diameter of 250 mm were respectively filled with 30 L of DIAION CR20 and 10 L of LEWATIT S100H, and the reactor was connected to the bottom of the towers in series through a pump by piping from the bottom of the reactor to form a circulation pipeline for returning to the top of the reactor. While keeping the solution obtained in the former step at a temperature of 25 to 30 degrees centigrade, the solution was allowed to flow to respective towers from the bottom of the reactor at a pump flow rate of 1.2 $m^3$/hour and a liquid flow velocity SV of 40 (1/hour) and 120 (1/hour), to continuously operate for 7 hours while returning to the reactor. The solution inside the towers and the pipeline was all returned to the reactor (second step). Furthermore, the first step and the second step were repeated again in this order.

Next, 20 g (0.1 mol) of 3-pyridinesulfonic acid and water were added to the solution obtained after carrying out the first step and the second step two times, and the mixture was heated at 100 degrees centigrade for 4 hours with stirring under a nitrogen atmosphere and cooled to room temperature. While keeping the thus-obtained solution at a temperature of 25 to 30 degrees centigrade, the solution was continuously allowed to flow to respective towers at a pump flow rate of 0.8 m³/hour and a liquid flow velocity SV of 27 (1/hour) and 80 (1/hour) for 7 hours (second step). The solution inside the towers and the pipeline was all returned to the reactor.

This solution as collected from the reactor and precipitated in the same manner as in Example 2 to analyze the residual metal of a hydrogenated ring-opening metathesis polymer in the form of a white powder and as a result, the content of molybdenum metal in the polymer was 80 ppb, the content of ruthenium metal was 105 ppb, and the molar ratio of the structural units [A]/[B]/[C] was 42/50/8.

Comparative Example 1

1 kg of a THF solution of the hydrogenated ring-opening metathesis polymer obtained in Synthesis Example 2, 1.44 g (11.7 mmol) of isonicotinic acid and 27 g of water were added, and the mixture was heated at 100 degrees centigrade for 6 hours with stirring under a nitrogen atmosphere and then cooled to room temperature in the same manner as in Example 2.

This solution was filtered through a membrane filter made of Teflon having a pore diameter of 0.5 μm, and 10 g of the filtrate was added to 200 ml of water to precipitate a hydrogenated ring-opening metathesis polymer which was separated by filtration and then subjected to vacuum drying to obtain 1.95 g of a hydrogenated ring-opening metathesis polymer in the form of a white powder. The content of molybdenum metal in the polymer was 69 ppm and the content of ruthenium metal was 30 ppm. The amount of the residual metal was never changed and the effect was not observed.

Comparative Example 2

1 kg of a THF solution of the polymer was filtered through a membrane filter made of Teflon in the same manner as in Comparative Example 1, 400 ml of DIAION CR20 was added thereto, and the mixture was stirred at room temperature for 1 hour. Then, an ion exchange resin was separated by filtration. 10 g of the hydrogenated ring-opening metathesis polymer solution was precipitated in the same manner as in Comparative Example 1 to obtain 1.8 g of a hydrogenated ring-opening metathesis polymer. The content of molybdenum metal in the polymer was 47 ppm and the content of ruthenium metal was 30 ppm, and the effect was not observed.

Comparative Example 3

1 kg of a THF solution of the polymer was added to 360 mg (4.9 mmol) of trimethylenediamine in the same manner as in Comparative Example 1, and the mixture was stirred at room temperature for 30 minutes. The filtered solution was added to 5.0 kg of methanol to precipitate a hydrogenated ring-opening metathesis polymer which was filtered and then subjected to vacuum drying and again dissolved in 800 g of THF. With the addition of 0.9 g (4.7 mmol) of citric acid, the mixture was stirred at room temperature for 30 minutes, and the filtered solution was added to 5.0 kg of methanol to precipitate a hydrogenated ring-opening metathesis polymer which was subjected to vacuum drying to obtain a white powder. The content of molybdenum metal in the resulting polymer was 32 ppm and the content of ruthenium metal was 30 ppm, and the effect was not observed.

Comparative Example 4

1 kg of a THF solution of the polymer was allowed to flow at a liquid flow velocity SV of 40 in a 100 ml activated alumina (a product of Wako Pure Chemical Industries, Ltd.) phase in the same manner as in Comparative Example 1, and the same operation was repeated two times. 10 g of the hydrogenated ring-opening metathesis polymer solution was precipitated in the same manner as in Comparative Example 1 to obtain 1.8 g of a hydrogenated ring-opening metathesis polymer. The content of molybdenum metal in the polymer was 78 ppm and the content of ruthenium metal was 30 ppm. The amount of the residual metal was never changed and the effect was not observed.

Industrial Applicability

According to the method for purifying a polymer containing a hetero atom and having high polarity of the present invention, it is possible to provide a cyclic olefin polymer as optical components requiring high transparency, materials for use in the most advanced technologies of an organic EL, a liquid crystal plastic substrate, a resist composition and the like, without causing deterioration of optical properties during a product manufacturing process and adverse effect on electrical and electronic properties due to the change of color such as yellowing or the like, or contamination of metals in a semiconductor manufacturing process, by removing the residual metal component of the production catalyst with good efficiency. Thus, the purification method is industrially very valuable.

The invention claimed is:

1. A method for purifying a polymer in which a solution comprising a cyclic olefin polymer containing at least a repeating structural unit represented by the general formula (1) and a metal component is brought into contact with an organic compound containing a basic functional group and an acidic functional group, and then said solution is brought into contact with a basic adsorbent to remove the metal component contained in said solution,

[Chemical Formula 1]

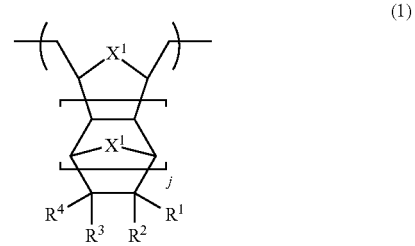

(1)

wherein, in the formula, at least one of $R^1$ to $R^4$ is selected from alkoxycarbonyl having 2 to 20 carbon atoms, alkoxyalkyloxycarbonyl having 3 to 20 carbon atoms, alkoxycarbonylalkyloxycarbonyl having 4 to 20 carbon atoms and cyano having 1 to 20 carbon atoms, the others are selected from hydrogen, alkyl having 1 to 20 carbon atoms, halogen, alkyl halide having 1 to 20 carbon atoms, alkoxy having 1 to 20 carbon atoms, alkoxyalkyl having 2 to 20 carbon atoms and aryloxycarbonyl having 6 to 20 carbon atoms, and $R^1$ to $R^4$ may be bonded to each other to form a cyclic structure; $X^1$ is selected from —O—, —S—, —NR$^5$—, —PR$^5$— and —CR$^5$R$^6$— ($R^5$ and $R^6$ each independently represent hydrogen or alkyl having 1 to 20 carbon atoms) and may be the same or different from each other; and j represents 0 or 1.

2. The method for purifying a polymer according to claim 1, in which said metal component is any of molybdenum, ruthenium, tungsten, palladium and rhodium.

3. The method for purifying a polymer according to claim 1, in which the basic functional group of said organic compound is an electron-pair donor and the acidic functional group is a proton donor.

4. The method for purifying a polymer according to claim 1, in which said organic compound containing a basic functional group and an acidic functional group is any of nicotinic acid, isonicotinic acid, picolinic acid, 2,2'-bipyridine-4,4'-dicarboxylic acid and 3-pyridinesulfonic acid.

5. The method for purifying a polymer according to claim 1, in which the basic functional group contained in said basic adsorbent is an amino group.

6. The method for purifying a polymer according to claim 1, in which said solution containing said cyclic olefin polymer is brought into contact with said organic compound containing a basic functional group and an acidic functional group to form an aggregate consisting of said metal component contained in said solution and said organic compound, and
said solution forming said aggregate is brought into contact with a basic adsorbent and the aggregate contained in said solution is adsorbed onto said basic adsorbent to remove said metal component contained in said solution.

7. The method for purifying a polymer according to claim 1, in which said solution containing said cyclic olefin polymer is brought into contact with the organic compound containing a basic functional group and an acidic functional group, and then said solution containing said cyclic olefin polymer is allowed to pass through a basic adsorbent-packed tower to remove said metal component.

8. The method for purifying a polymer according to claim 1, in which said solution containing said cyclic olefin polymer is mixed with the organic compound containing a basic functional group and an acidic functional group, and then said basic adsorbent is added to this mixture, to remove said metal component by separating said basic adsorbent.

9. The method for purifying a polymer according to claim 1, in which said cyclic olefin polymer comprises a repeating structural unit [B] represented by the general formula (2), and the molar ratio [A]/[B] of the repeating structural unit [A] to the repeating structural unit [B] is from 25/75 to 90/10,

[Chemical Formula 2]

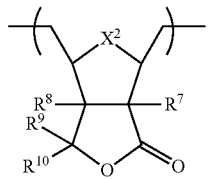

(2)

wherein, in the formula, $R^7$ to $R^{10}$ are each independently hydrogen or alkyl having 1 to 10 carbon atoms; and $X^2$ is selected from —O—, —S—, —$NR^{11}$—, —$PR^{11}$— and —$CR^{11}R^{12}$—($R^{11}$ and $R^{12}$ each independently represent hydrogen or alkyl having 1 to 20 carbon atoms).

10. The method for purifying a polymer according to claim 9, in which one of $X^1$ of said repeating structural unit [A] and $X^2$ of said repeating structural unit [B] is —O—, and the other is —$CH_2$—.

11. The method for purifying a polymer according to claim 9, in which said cyclic olefin polymer comprises said repeating structural unit [B] and a repeating structural unit [C] represented by the general formula (3), and the molar ratio ([A]+[B])/[C] of the repeating structural units [A] and [B] to the repeating structural unit [C] is from 95/5 to 5/95,

[Chemical Formula 3]

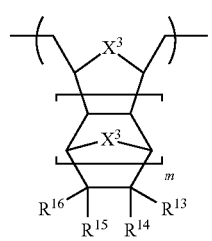

(3)

wherein, in the formula, at least one of $R^{13}$ to $R^{18}$ is selected from carboxylic acid and hydroxycarbonylalkyl having 2 to 20 carbon atoms, the others are selected from hydrogen, alkyl having 1 to 20 carbon atoms, halogen, alkyl halide having 1 to 20 carbon atoms, alkoxy having 1 to 20 carbon atoms, alkoxyalkyl having 2 to 20 carbon atoms, alkoxycarbonyl having 2 to 20 carbon atoms and aryloxycarbonyl having 6 to 20 carbon atoms, and $R^{13}$ to $R^{16}$ may be bonded to each other to form a cyclic structure; $X^3$ is selected from —O—, —S—, —$NR^{17}$—, —$PR^{17}$— and —$CR^{17}R^{18}$—($R^{17}$ and $R^{18}$ each independently represent hydrogen or alkyl having 1 to 20 carbon atoms) and may be the same or different from each other; and m represents 0 or 1.

12. The method for purifying a polymer according to claim 11, in which at least one of $X^1$ of said repeating structural unit [A], $X^2$ of said repeating structural unit [B] and $X^3$ of said repeating structural unit [C] is —O—, and the other are —$CH_2$—.

13. A cyclic olefin polymer obtained by the purification method according to claim 1, wherein the content of all residual metal components is equal to or less than 1,000 ppb.

* * * * *